United States Patent
Tanaka et al.

(10) Patent No.: US 6,256,040 B1
(45) Date of Patent: Jul. 3, 2001

(54) THREE-DIMENSIONAL GAME MACHINE AND INFORMATION STORAGE MEDIUM

(75) Inventors: Kyota Tanaka, Kawasaki; Masateru Umeda, Yokohama; Yuichiro Komoriya, Ohta-ku; Koji Yamaguchi, Yokohama, all of (JP)

(73) Assignee: NAMCO, Ltd., Tokyo (JP)

( * ) Notice: Subject to any disclaimer, the term of this patent is extended or adjusted under 35 U.S.C. 154(b) by 0 days.

(21) Appl. No.: 09/011,709

(22) PCT Filed: Jun. 20, 1997

(86) PCT No.: PCT/JP97/02129

§ 371 Date: Mar. 9, 1998

§ 102(e) Date: Mar. 9, 1998

(30) Foreign Application Priority Data

Jun. 21, 1996 (JP) .................................................. 8-181131
Jun. 21, 1996 (JP) .................................................. 8-181592

(51) Int. Cl.$^7$ .................................................. G06T 15/40
(52) U.S. Cl. .......................... 345/421; 345/426; 345/427; 345/430; 345/473; 463/3; 463/6; 463/33
(58) Field of Search .................................. 345/421, 426, 345/430, 419, 327, 473, 427; 463/3, 6, 33

(56) References Cited

U.S. PATENT DOCUMENTS

| 4,521,020 | 6/1985 | Uemura et al. ........................ 463/3 |
| 5,640,496 | 6/1997 | Hardy et al. ......................... 345/421 |
| 5,734,413 | 3/1998 | Lappington et al. ................ 345/327 |
| 5,742,749 | 4/1998 | Foran et al. ......................... 345/426 |
| 5,862,508 | 1/1999 | Nagaya et al. ...................... 345/473 |
| 6,034,693 | 3/2000 | Kobayashi et al. ................. 345/430 |

FOREIGN PATENT DOCUMENTS

| JP-A 61-193688 | 8/1986 | (JP) . |
| JP-A 8-149600 | 6/1996 | (JP) . |
| JP-A 8-155143 | 6/1996 | (JP) . |

*Primary Examiner*—Mark Zimmerman
*Assistant Examiner*—Kimbinh T. Nguyen
(74) *Attorney, Agent, or Firm*—Oliff & Berridge, PLC.

(57) ABSTRACT

A covering object (42) that covers a three-dimensional object (40) is provided within an object space. Every time a game-clear condition is satisfied, the display/non-display state of a polygon forming the covering object (42) is sequentially switched. If a moving body (44) moves to specify a region (36), the polygons of that region (36) are set to non-display. Alternatively, polygons that form the covering object (42) are sequentially set to non-display, on the basis of a criterion such as the ratio of correct answers in a quiz game, whether or not a mini-game has been cleared, or whether or not the player has won in Mah-Jongg. The transparent/nontransparent state of the covering object could equally well be switched sequentially, or the translucency thereof could be sequentially changed, or a texture mapped onto the three-dimensional object could be sequentially changed. If the region (36) is specified by the movement track of the moving body (44) intersecting itself, the image information of that region (36) is changed. A field-of-view image is synthesized from a viewpoint and a line-of-sight direction that follow the movement of the moving body (44).

27 Claims, 25 Drawing Sheets

| VERTEX INDEX | POSITION INFORMATION | LOWER NEIGH-BOR | LEFT-HAND NEIGH-BOR | UPPER NEIGH-BOR | RIGHT-HAND NEIGH-BOR |
|---|---|---|---|---|---|
| ⋮ | ⋮ | ⋮ | ⋮ | ⋮ | ⋮ |
| V6 | $X_{V6}, Y_{V6}, Z_{V6}$ | V1 | V5 | V11 | V7 |
| V7 | $X_{V7}, Y_{V7}, Z_{V7}$ | V2 | V6 | V12 | V8 |
| V8 | $X_{V8}, Y_{V8}, Z_{V8}$ | V3 | V7 | V13 | V9 |
| ⋮ | ⋮ | ⋮ | ⋮ | ⋮ | ⋮ |

| VERTEX INDEX | POSITION INFORMATION | | |
|---|---|---|---|
| V0 | $X_{V0}$ | $Y_{V0}$ | $Z_{V0}$ |
| V1 | $X_{V1}$ | $Y_{V1}$ | $Z_{V1}$ |
| V2 | $X_{V2}$ | $Y_{V2}$ | $Z_{V2}$ |
| ⋮ | ⋮ | ⋮ | ⋮ |
| V17 | $X_{V17}$ | $Y_{V17}$ | $Z_{V17}$ |

| POLYGON IDENTIFICATION INFORMATION | VERTEX INDEX SEQUENCE INFORMATION | TEXTURE COORDINATES | TRANSPARENCY |
|---|---|---|---|
| P0 | V0-V1-V7-V6 | $U_0(P0), V_0(P0)$ to $U_3(P0), V_3(P0)$ | $T_{P0}$ |
| P1 | V1-V2-V8-V7 | $U_0(P1), V_0(P1)$ to $U_3(P1), V_3(P1)$ | $T_{P1}$ |
| P2 | V2-V3-V9-V8 | $U_0(P2), V_0(P2)$ to $U_3(P2), V_3(P2)$ | $T_{P2}$ |
| ⋮ | ⋮ | ⋮ | ⋮ |
| P11 | V11-V6-V12-V17 | $U_0(P11), V_0(P11)$ to $U_3(P11), V_3(P11)$ | $T_{P11}$ |

CHANGE IN TRANSPARENCY

TEXTURE PLANE

TEXTURE PLANE   TEXTURE PLANE

THREE-DIMENSIONAL GAME MACHINE AND INFORMATION STORAGE MEDIUM

TECHNICAL FIELD

This invention relates to a three-dimensional game machine and an information storage medium that enable the synthesizing of a field-of-view image from a given viewpoint and line-of-sight direction within an object space.

BACKGROUND ART

A game machine that is known in the art displays a game image on a screen to enable the playing of a game such as Mah-Jongg or a puzzle. This type of game machine necessitates various contrivances to encourage the player to replay it. One such contrivance that could be considered is a method of displaying a two-dimensional picture to please the eyes of the player if one game-clear condition among a plurality of game-clear conditions has been satisfied (for example, if a game of Mah-Jongg has been won or one game stage of a puzzle game has been cleared), as a game-clear reward. This method ensures that the player keeps on playing the game in order to see the two-dimensional pictures, enabling a huge increase in the enjoyment of the game.

However, the picture displayed as a game-clear reward by the above described method is a two-dimensional image, which causes problems in that the impact on a player weakens and is likely to become baring. A particular technical problem with a two-dimensional picture is the way in which there is no variation in the image seen by the player, regardless of the position of the viewpoint thereof, making it lacking in realism.

Another game machine that is known in the art displays a game image on a screen to create a chase game between an enemy character and the player's own vehicle which is operated by the player on a given game field. The objective of this game machine is to satisfy a given game-clear condition within a time limit, while trying not to be caught by the enemy character, and the sense of speed thereof makes such games popular.

However, this game machine has a technical problem in that the game field through which the player's own vehicle and the enemy character move is a two-dimensional field, and thus there is a lack of visual effect on the player and no dramatic impact during the playing of the game. There is also nothing to encourage the player to replay the game and the player is likely to become bored with it.

This invention was devised in order to solve the above described technical problems and has as an objective thereof the provision of a three-dimensional game machine and an information storage medium with outstanding visual effects that make it possible to encourage the player to continue playing the game.

DISCLOSURE OF THE INVENTION

In order to solve the above described technical problems, there is provided a three-dimensional game machine of this invention. According to a first aspect of this invention, there is provided a three-dimensional game machine comprising:

means for setting the dispositions within an object space of at least one three-dimensional object and a covering object that is provided in such a manner as to cover that at least one three-dimensional object;

image information changing means for sequentially switching the display/non-display state of at least one polygon or at least one curved surface configuring the covering object every time one game-clear condition among a plurality of given game-clear conditions is satisfied; and means for synthesizing a field-of-view image as seen from a given viewpoint within the object space.

With this aspect of the invention, the display/non-display state of a polygon or curved surface is switched every time a game-clear condition is satisfied. If a polygon or the like of the covering object is set to non-display, an image of a three-dimensional object can be gradually made visible in a portion that was hidden by this and other polygons, which makes it possible to achieve an outstanding visual effect. Note that the position or number of polygons or curved surfaces that are set to display or non-display could be changed based on the degree of difficulty or type of the game-clear condition, for example.

According to a second aspect of this invention, there is provided a three-dimensional game machine comprising:

means for setting the dispositions within an object space of at least one three-dimensional object and a covering object that is provided in such a manner as to cover that at least one three-dimensional object;

image information changing means for sequentially switching the transparent/non-transparent state of at least a part of the covering object, or for sequentially changing the transparency of at least a part of the covering object, every time one game-clear condition among a plurality of given game-clear conditions is satisfied; and means for synthesizing a field-of-view image as seen from a given viewpoint within the object space.

With this aspect of the invention, at least a part of a covering object (for example, a polygon or curved surface thereof) is switched from being non-transparent to being transparent, or the translucency thereof is changed, every time a game-clear condition is satisfied. If the polygons or the like of the covering object become transparent in sequence or the translucency thereof changes, an image of a three-dimensional object will gradually become visible in a portion that was hidden by those polygons, making it possible to achieve an outstanding visual effect. In particular, if the translucency is changed in a step-wise manner, the visual effect can be even further improved. Note that the position or number of polygons or curved surfaces that are set to display or non-display could be changed based on the degree of difficulty or type of the game-clear condition, for example.

According to a third aspect of this invention, there is provided a three-dimensional game machine comprising:

means for setting the disposition of at least one three-dimensional object within an object space;

image information changing means for sequentially changing a texture that is mapped over at least a part of the three-dimensional object, every time one game-clear condition among a plurality of given game-clear conditions is satisfied; and means for synthesizing a field-of-view image as seen from a given viewpoint within the object space.

This aspect of the invention makes it possible to achieve a visual effect that is similar to that of the method of non-displaying polygons of a covering object that covers a three-dimensional object, by, for example, changing the texture of the mapping. Note that this change of texture could be achieved by changing the texture coordinates that specify the texture, or by redrawing the texture itself. Note also that the range of texture to be changed could be changed based on the degree of difficulty or type of the game-clear condition, for example.

The game-clear condition may be at least one of: clearing at least one game stage of a plurality of game stages, clearing at least one mini-game of a plurality of mini-games, and specifying at least one region among a plurality of regions. This makes it possible to gradually reveal or change an image of a three-dimensional object as a game-clear reward for the player, every time a game stage is cleared, every time a mini-game is cleared, or every time a region is specified. This encourages the player to play the next game stage, play the next mini-game, or specify the next region, making it possible to encourage the player to continue playing the game.

Note that the setting of the viewpoint and line-of-sight direction could be set on the basis of operating information that the player inputs through an operating means. This makes it possible to obtain a field-of-view image from a viewpoint and line-of-sight direction as desired by the player, enabling a further increase in the enjoyment of the game.

According to a fourth aspect of this invention, there is provided a three-dimensional game machine comprising:

moving body computation means for performing computations to cause a moving body to move over a covering object that is provided in such a manner as to cover at least one three-dimensional object that is disposed within an object space, on the basis of operating information from an operating means;

image information changing means for changing image information of the covering object within a specified region, when the region is specified by a movement of the moving body, the region being among a plurality of regions into which the covering object has been previously divided; and means for synthesizing a field-of-view image for a viewpoint and line-of-sight direction that follow the movement of the moving body around the covering object.

With this aspect of the invention, the moving body moves over the covering object that covers the three-dimensional object, on the basis of operating information from an operating means, and the player can specify any desired region by this movement. The image information for the thus specified region is changed. In this case, it is preferable that the image information is changed in such a manner that the image is made visible of a three-dimensional object that was covered by the covering object in the specified region. The viewpoint and line-of-sight direction used to synthesize the field-of-view image follow the movement of the moving body. At least part of the change in image in the specified region is set to become visible. This aspect of the invention therefore makes it possible for the player to enjoy a station in which the player operates the moving body to see an image of a covering object that sequentially changes, or make visible an image of a three-dimensional object that was covered by that covering object. This makes it possible to achieve an outstanding visual effect. The player can also enjoy a game of moving the moving body over a covering object that forms a three-dimensional game field. The sense of excitement and dynamism experienced by the player can thus be greatly increased.

According to a fifth aspect of this invention, there is provided a three-dimensional game machine comprising:

moving body computation means for performing computations to cause a moving body to move over a covering object that is provided in such a manner as to cover at least one three-dimensional object that is disposed within an object space, on the basis of operating information from an operating means;

image information changing means for changing image information of the covering object within a specified region, when a movement track of the moving body intersects itself and the region is specified as a closed region bounded by an edge defined by the intersecting movement track; and means for synthesizing a field-of-view image for a given viewpoint and line-of-sight direction within the object space.

With this aspect of the invention, a region is specified by the movement track of the moving body intersecting itself, and the image information of the covering object is changed within this specified region. It, for example, a closed covering object is used when a three-dimensional object is covered with a covering object, it is possible to ensure that the three-dimensional object cannot be seen at the start of the game, regardless of the position from which it is viewed. This aspect of the invention enables simple specification of regions, even when this closed covering object is used.

The image information changing means may switch the display/non-display state of at least one polygon or at least one curved surface in the specified region, when the covering object is formed of a plurality of polygons or a plurality of curved surfaces.

The image information can be changed by switching the display/non-display state of a polygon or curved surface configuring the covering object. If a polygon or the like of the covering object is set to non-display, it is possible to make an image of a three-dimensional object become visible in a portion that was covered by that polygon, enabling an outstanding visual effect.

The image information changing means may switch the transparent/non-transparent state of at least a part of the covering object within the specified region, or change the transparency of at least a part of the covering object.

A part of the covering object can be switched between non-transparent and transparent, or the translucency thereof can be changed. This makes it possible for the player to see an image of the three-dimensional object at that portion. In particular, if the translucency is changed in a step-wise manner so that the image of the three-dimensional object gradually becomes visible, the visual effect can be even further improved.

According to a sixth aspect of this invention, there is provided a three-dimensional game machine comprising:

moving body computation means for performing computations to cause a moving body to move over at least one three-dimensional object disposed within an object space, on the basis of operating information from an operating means;

image information changing means for changing image information of the three-dimensional object within a specified region, when the region is specified by a movement of the moving body, the region being among a plurality of regions into which the three-dimensional object has been previously divided; and means for synthesizing a field-of-view image from a viewpoint and line-of-sight direction that follow the movement of the moving body around the three-dimensional object.

With this aspect of the invention, the moving body moves over the three-dimensional object on the basis of operating information from an operating means, and image information in a region specified by this movement is changed. Since the viewpoint also follows the movement of the moving body, the player can enjoy a three-dimensional image of a three-dimensional object that changes sequentially as the player operates the moving body. Since the player can enjoy a game of moving the moving body over the three-dimensional object that forms a three-dimensional game field, the sense of excitement and dynamism experienced by the player can thus be greatly increased.

According to a seventh aspect of this invention, there is provided a three-dimensional game machine comprising:

moving body computation means for performing computations to cause a moving body to move over at least one three-dimensional object disposed within an object space, on the basis of operating information from an operating means;

image information changing means for changing image information of the three-dimensional object within a specified region, when a movement track of the moving body intersects itself and the region is specified as a closed region bounded by an edge defined by the intersecting movement track; and means for synthesizing a field-of-view image for a given viewpoint and line-of-sight direction within the object space.

With this aspect of the invention, a region is specified by the movement track of the moving body intersecting itself, and the image information of the three-dimensional object in the thus specified region is changed. This aspect of the invention enables simple specification of a region when the surface of a three-dimensional object is used as a game field, for example.

The image information changing means may change a texture that is mapped over at least part of the specified region.

By changing the texture of the mapping, a visual effect that is similar to that of the method of non-displaying polygons of a covering object that covers a three-dimensional object, for example, can be achieved. Note that this change of texture could be achieved by changing the texture coordinates that specify the texture, or by redrawing the texture itself.

The moving body computation means may perform computations to cause the moving body to move on the edge of a polygon, when the three-dimensional object or the covering object is formed of polygons, on the basis of vertex position information of the polygon.

Based on position information of the first and second vertices of a polygon, for example, position information for a moving body that moves between these two vertices can be obtained. By using this information, the movement of a moving body along an edge that connects the first vertex to the second vertex can be computed. In particular, vertex position information for the polygon may be used during the polygon display processing. Therefore, the vertex position information used during display processing can be efficiently utilized.

BEST MODE FOR CARRYING OUT THE INVENTION

Embodiments of this invention are described below with reference to the accompanying drawings.

Embodiment 1

Figure 1:
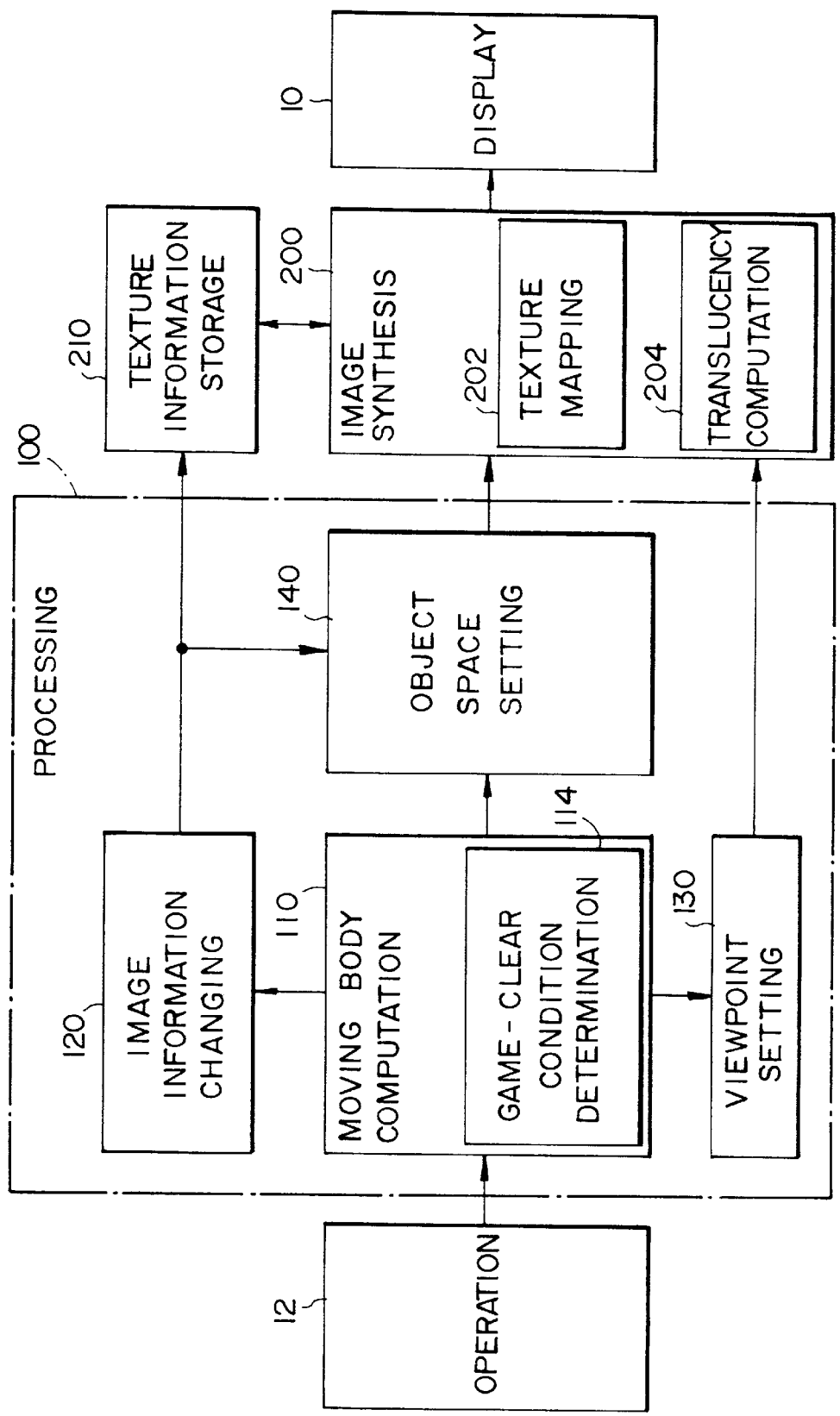
FIG. 1 shows a typical functional block diagram of Embodiment 1.

A functional block diagram of a first embodiment is shown in FIG. 1. In this figure, a operation section 12 is intended to allow a player to input operating information by manipulating controls such as a joystick and buttons (components 1102 and 1104 in FIG. 24A), and the operating information obtained by the operation section 12 is output to a processing section 100. The processing section 100 performs computations based on this operating information and a given program, to set an object space in which a plurality of objects are disposed to represent display objects. The functions of the processing section 100 are implemented by hardware, such as a CPU and memory. An image synthesis section 200 performs computations to synthesize a field-of-view image from a given viewpoint and line-of-sight direction within the thus-set object space. The functions of the image synthesis section 200 are implemented by hardware such as a dedicated image synthesis IC, CPU, and memory. If texture mapping is to be performed, images are synthesized by using texture information that is stored in a texture information storage section 210. The thus-obtained field-of-view image is displayed by a display section 10.

Figure 2A:
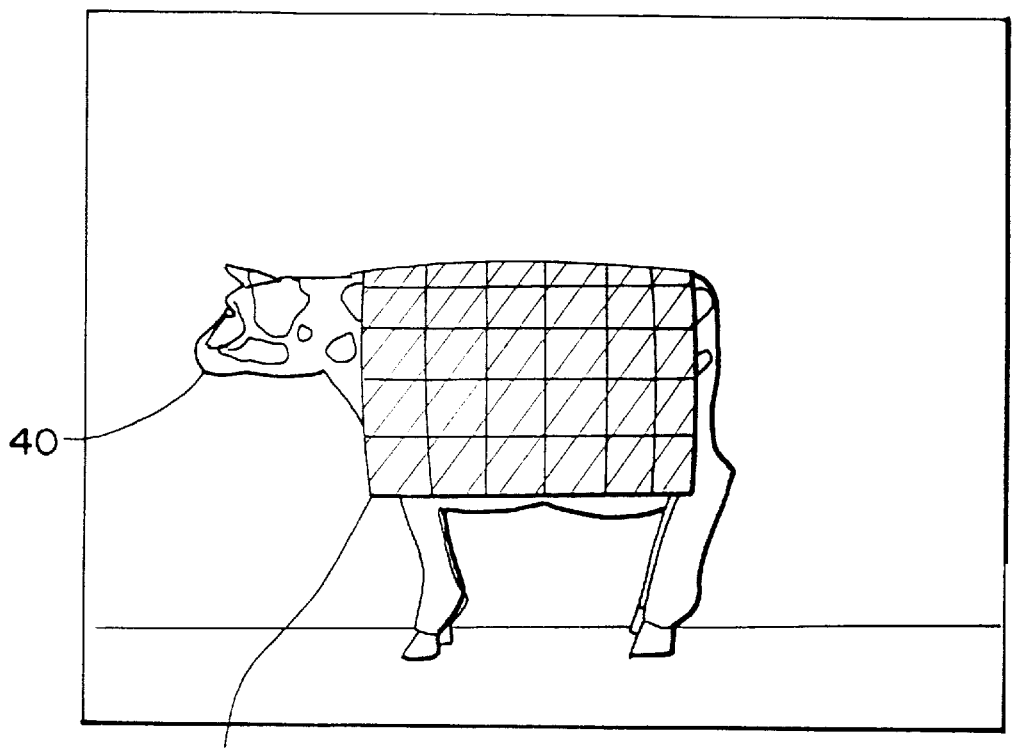
FIGS. 2A and 2B show typical game images (field-of-view images) created by Embodiment 1.

Examples of game images (field-of-view images) obtained by this embodiment are shown in FIGS. 2A to 4B. Objects such as a three-dimensional object 40 representing a cow, a covering object 42 that forms a game field provided so as to cover this three-dimensional object 40, and objects representing the background (not shown in the figure) are disposed within an object space (virtual three-dimensional space), as shown in FIG. 2A. The disposition of objects within this object space is performed by an object space setting section 140 in FIG. 1. Based on operating information input by the player using the operation section 12, a moving body 44 that is the player's own vehicle moves over the covering object 42, as shown in FIG. 2B. Note that a moving body 46 that is an enemy character also moves over the covering object 42 in this embodiment. The computations for causing these moving bodies to move are performed by a moving body computation section 110, shown in FIG. 1.

In this embodiment, image information of the covering object is changed every time one among a number of game-clear conditions is satisfied. In this case, a game-clear condition is the specification of one region among a plurality of regions; more specifically, it is the specification by the movement of the moving body of one region among several regions into which the covering object is divided. The determination of whether or not a game-clear condition has been satisfied is performed by a game-clear condition determination section 114, shown in FIG. 1, based on data such as position information of the moving body.

Changes in the image information are performed by an image information changing section 120 of FIG. 1. In particular, the image information of the covering object is changed within a specified region in this embodiment, when that region has been specified as a closed region bounded by an edge defined by the movement track of the moving body intersecting itself. More specifically, as shown by way of example in FIG. 2B, a region 36 within which a polygon is disposed is specified by the movement of the moving body 44 and the image information is changed so that the polygon disposed within this region 36 is set to non-display. In this case, the moving body 44 moves along the edge of the polygon disposed within the region 36, and this movement track specifies the region 36 by intersecting itself. By changing the image information of the region 36 and thus setting the polygons in this region to non-display, the player is enabled to see an image of a portion (part of the cow's hide) of the image of the three-dimensional object 40 that is hidden by the covering object 42.

Figure 2B:
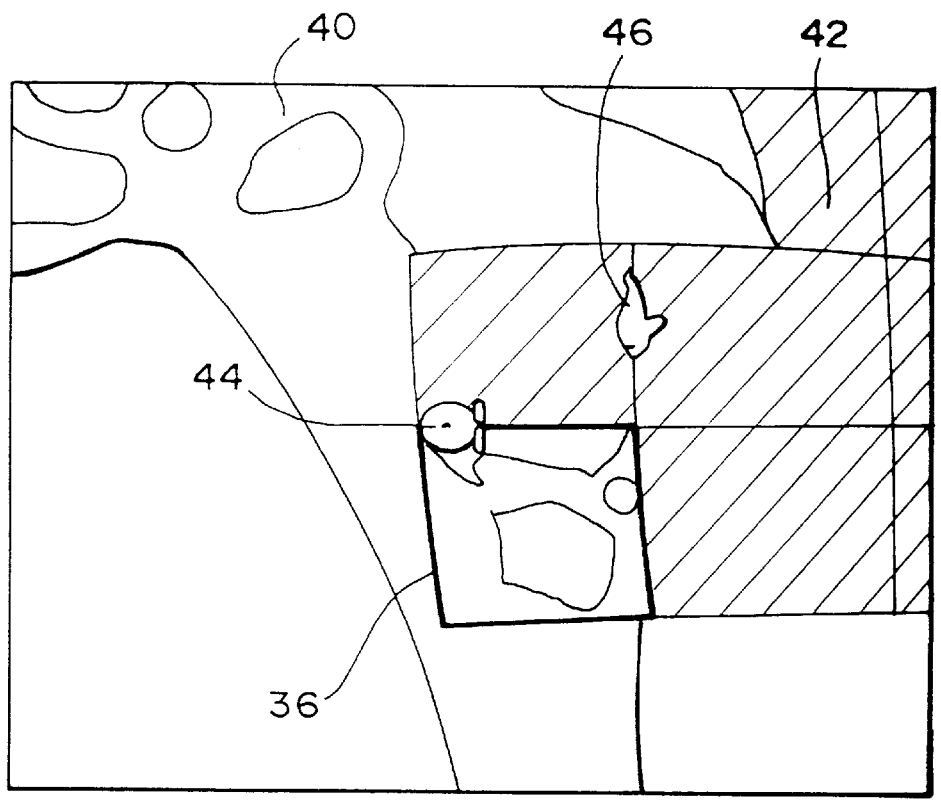
Figure 3A:
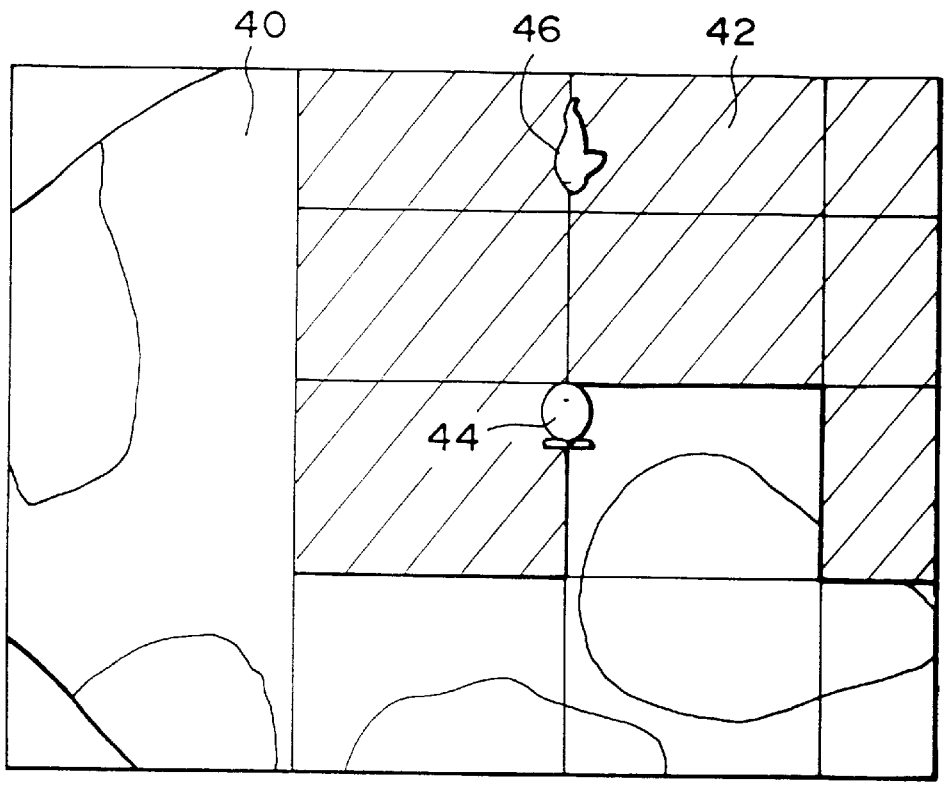
FIGS. 3A and 3B also show typical game images created by Embodiment 1.

This embodiment is particularly characterized in that a field-of-view image is synthesized for a viewpoint and line-of-sight direction that follow the movement of the moving body 44 along the edge of the covering object, as is clear from the changes in the game image shown in FIGS. 2B and 3A. In this case, the processing for setting the viewpoint and line-of-sight direction used in the synthesis of the field-of-view image is done by a viewpoint setting section 130 shown in FIG. 1. In this embodiment, the viewpoint follows the movement of the moving body. The player can see an image that changes within the specified region. This means that the player can successively see portions within an image of the three-dimensional object 40 that is covered by the covering object 42, making it possible to achieve an outstanding visual effect that is not available with a prior-art two-dimensional game machine.

Figure 3B:
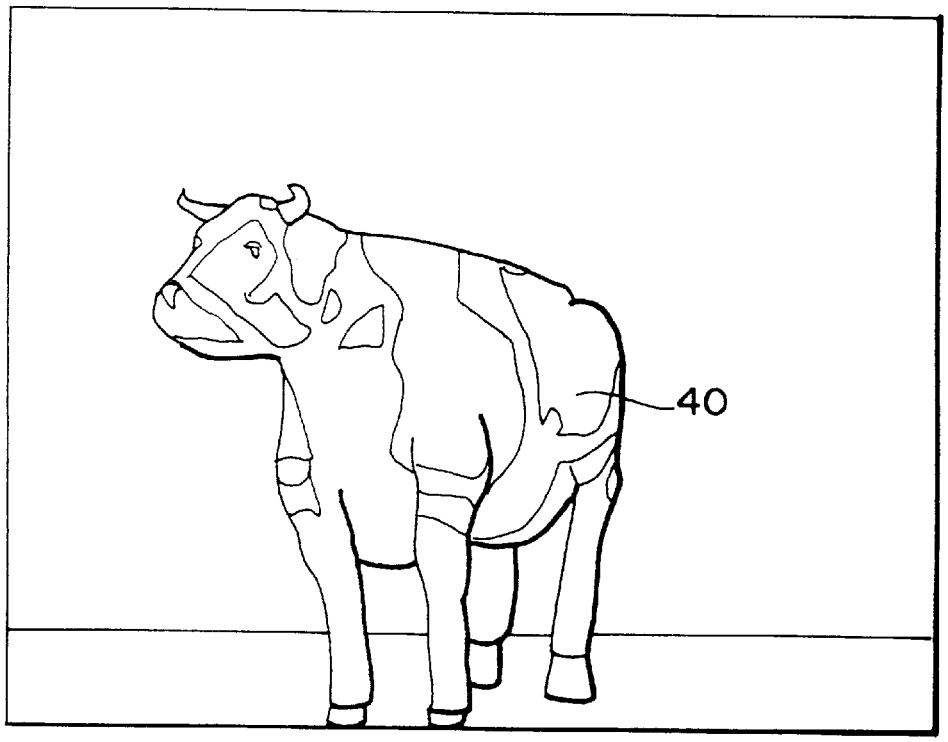

The moving body 44 successively sets the polygons of the covering object 42 to non-display, to avoid being caught by the moving body 46 that is the enemy character. The game ends when all of the polygons of the covering object 42 have been set to non-display, as shown in FIG. 3B.

Figure 4A:
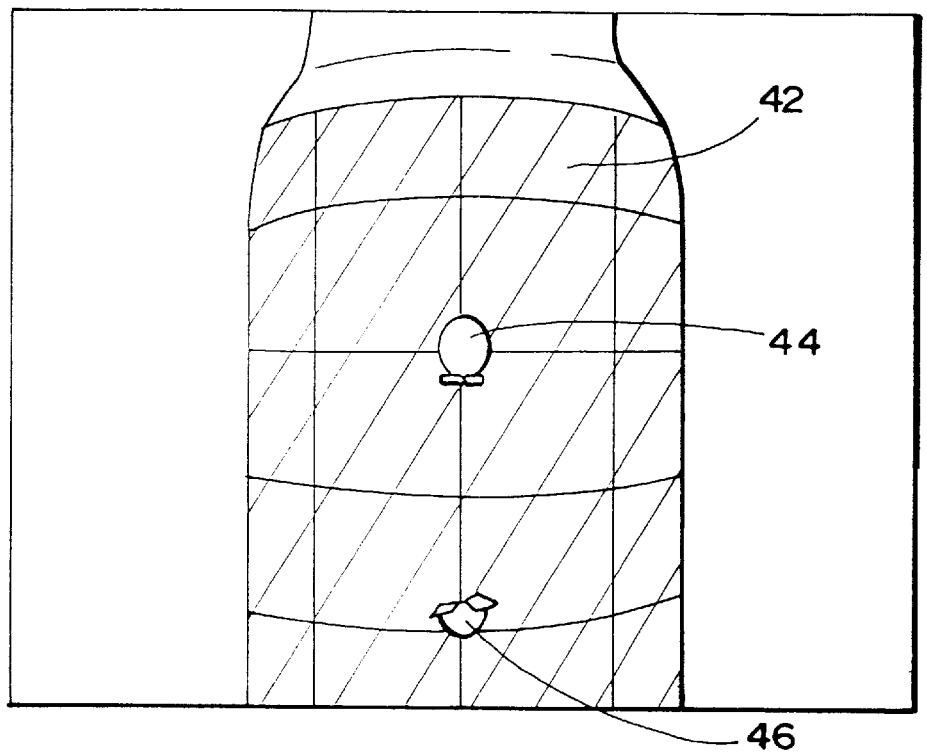
FIGS. 4A and 4B also show typical game images created by Embodiment 1.
Figure 4B:
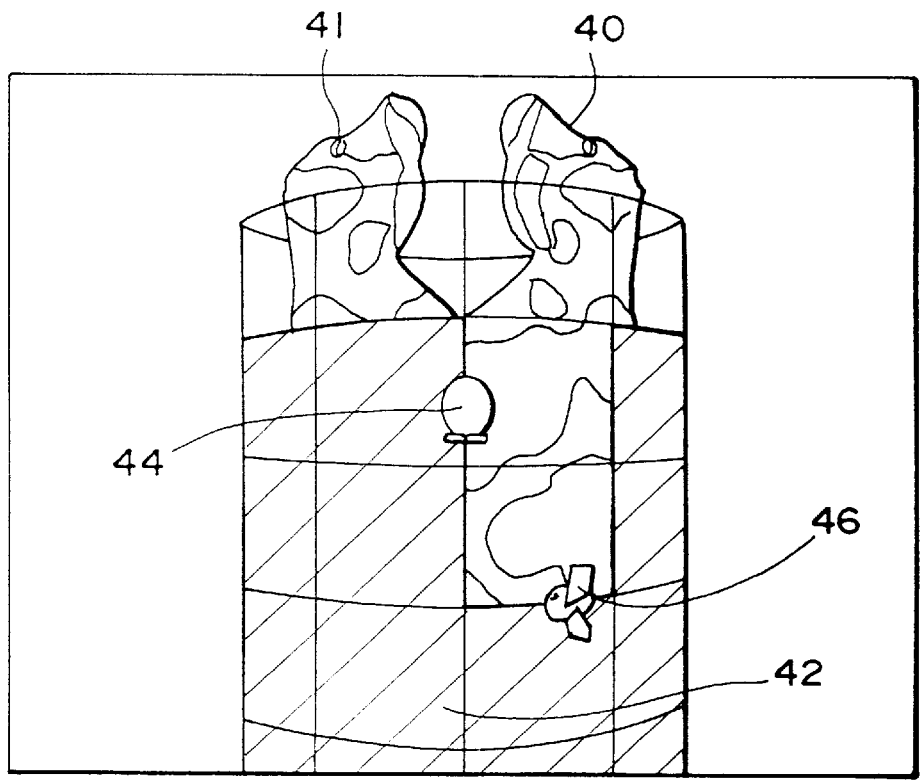

Note that one three-dimensional object 40 is shown covered by the covering object 42 in FIGS. 2A to 3B, but two or more three-dimensional objects could equally well be covered by a covering object. For example, two three-dimensional objects 40 and 41 could be covered by the covering object 42 patterned as a milk carton, as shown in FIGS. 4A and 4B. The player operates the moving body 44 and plays a game to sequentially set all of the polygons forming the covering object 42 to non-display, until the three-dimensional objects 40 and 41 disposed therein are completely visible.

In particular, when the three-dimensional objects 40 and 41 are completely covered by the covering object 42, a closed covering object 42 could be used, as shown in FIGS. 4A and 4B. In such a case, a particularly effective method of specifying a region is to use the movement track of the moving body to intersect itself.

Figure 25A:
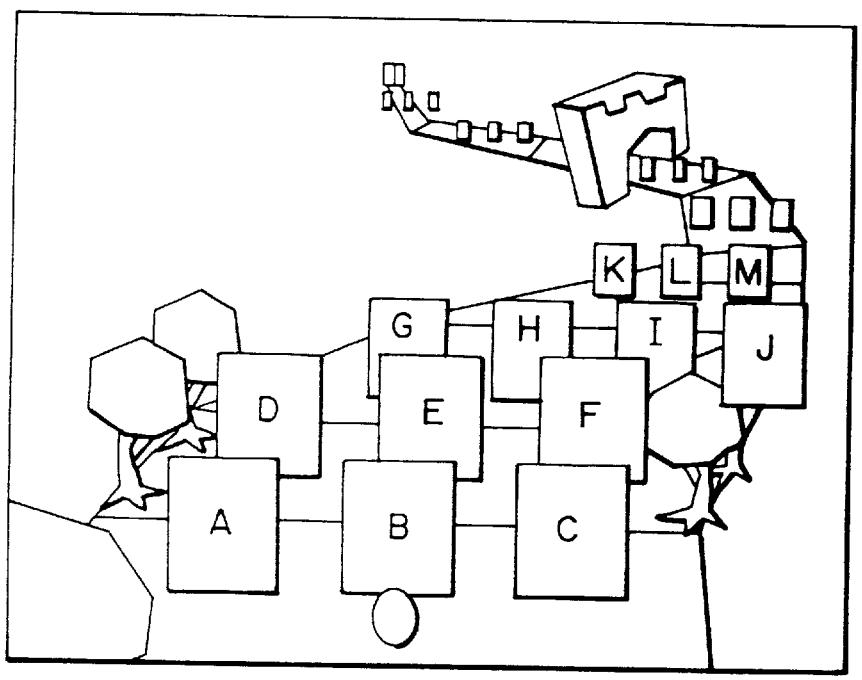
FIGS. 25A and 25B are views illustrative of a method of selecting game stages.

Detailed examples of this embodiment will now be described. In this embodiment, the image shown in FIG. 25A is displayed before the start of the game in each game stage. In FIG. 25A, identification images of three-dimensional objects that form representations of each game stage are displayed on panels A to M. For example, a simplified version of the three-dimensional object 40 representing the cow of FIG. 2A is displayed on panel A.

Figure 25B:
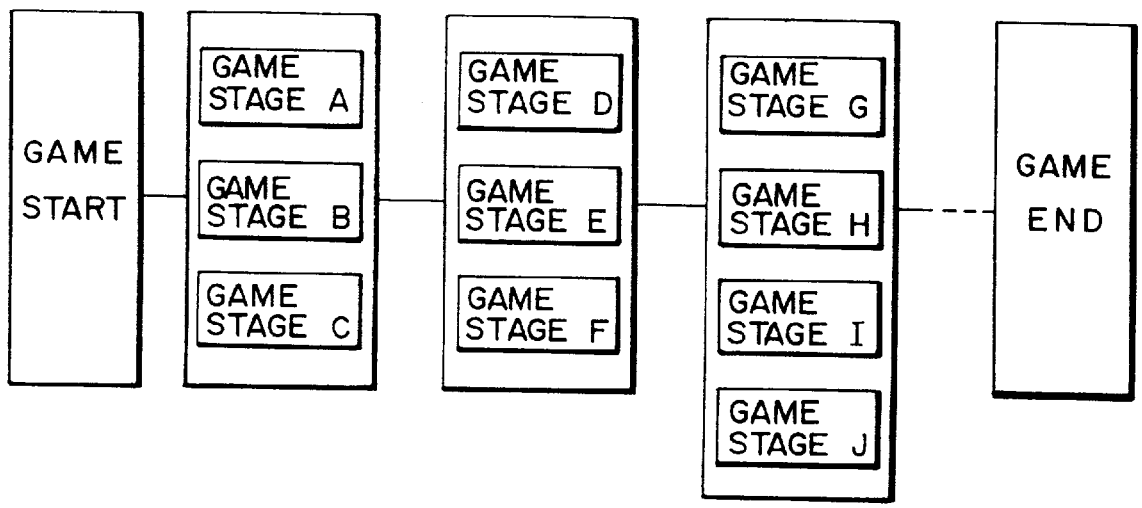

In this embodiment, a plurality of segments are provided between the start and end of the game, as shown in FIG. 25B, and a plurality of game stages are provided within each segment. For example, game stages A to C, D to F, and G to J could be provided in segments 1, 2, and 3, respectively. These game stages A to J correspond to the panels A to J of FIG. 25A. The player first plays one game stage of the game stages A to C within segment 1, which is selected either randomly or deliberately. If the player clears game stage A, for example, he or she progresses to segment 2 without playing the other game stages B and C in segment 1. The player then plays one game stage of the game stages D to F within segment 2, which is selected either randomly or deliberately.

With a game that has a two-branch structure, for example, the player has to repeat the first game stage many times in order to reach the end of the game. In contrast, the game stage structure of this embodiment makes it possible to move on to the next segment even if all of the game stages within one segment have not been played. Therefore, the player's interest is held so that he or she can play the final game stage and see the end of the game, without having to play the game for so long and for so many times. This makes it possible to greatly increase the enjoyment of the game.

Moreover, after playing the game from start to end, the player can enjoy a different game progression when replaying the game. In other words, the player can start the game again from the beginning to experience other game stages that weren't played before.

Figure 5:
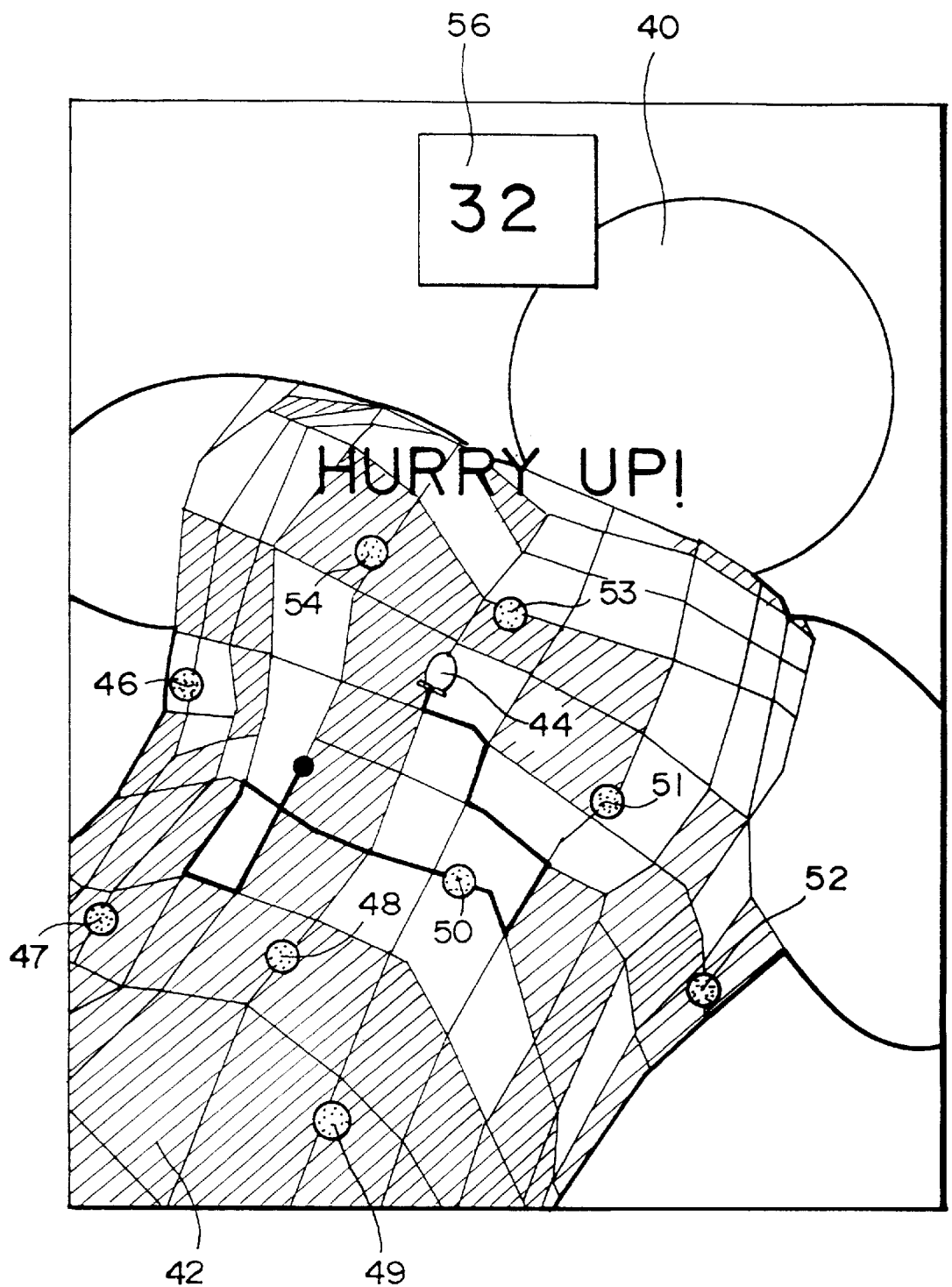
FIG. 5 is a view illustrative of a three-dimensional object, a covering object, and moving bodies.

Thus the player can be encouraged to replay the game, An example of a game image that is displayed after the game start is shown in FIG. 5. As shown in FIG. 5, the covering object 42 of this embodiment is provided to form a game field covering the three-dimensional object 40. This covering object 42 is formed of a plurality of polygons and the moving body 44 that is the player's own vehicle and moving bodies 46 to 54 that are enemy characters move along field frames that are the edges of these polygons. Above this game image is provided a timer display 56 that show the remaining time limit.

Figure 6A:
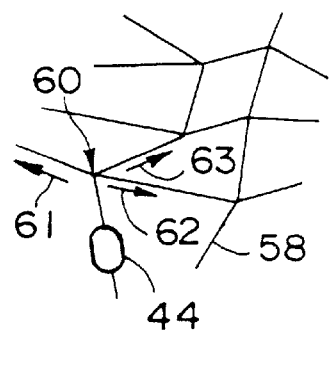
FIGS. 6A to 6F are views illustrative of the relationship between the specification of a region by the movement of the moving body and the enemy moving body.
Figure 6B:
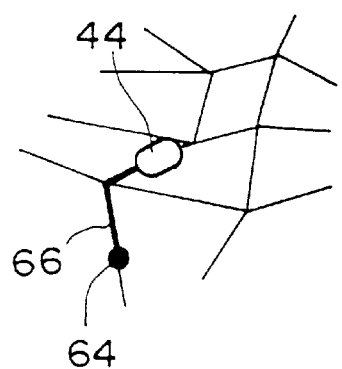
Figure 6C:
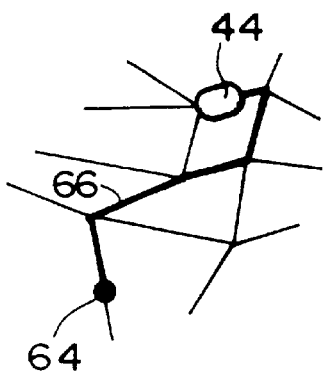

In this embodiment, the moving body 44 of the player's own vehicle proceeds forward at a constant speed, when the player is not pushing down on the joystick (1102 of FIG. 24A) of the operation section 12. Pushing the joystick in the upward direction accelerates the moving body 44; pushing it in the downward direction decelerates the body. Pressing the joystick to the left just before an intersection (polygon vertex) 60 of a field frame (the edge of the polygon) 58, as shown in FIG. 6A, moves the body in the direction of an arrow 61, pushing it to the right moves the body in the direction of an arrow 62, otherwise the body moves in the direction of an arrow 63. If the player presses a button (1104 in FIG. 24A) of the operation section 12, a marker 64 is displayed at the position of the moving body 44 at the time at which the button was pressed, as shown in FIG. 6B. If the button is pressed continuously at that point, a line 66 is drawn between the marker 64 and the moving body 44. This line 66 is drawn for as long as the button is pressed, as shown in FIG. 6C.

Figure 6D:
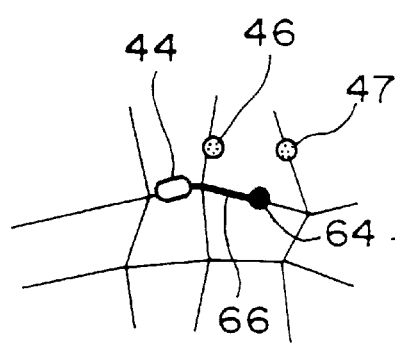
Figure 6E:
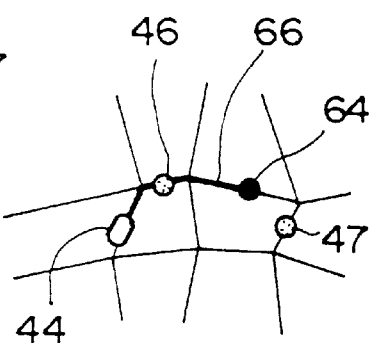
Figure 6F:
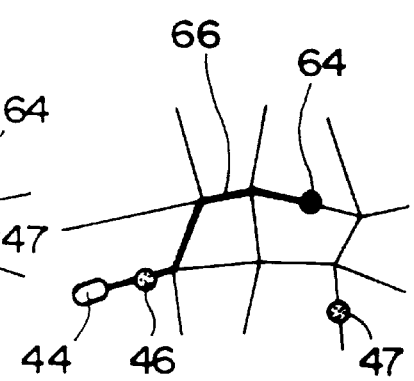

The enemy moving bodies 46 and 47 perform movements specified by given algorithms, as shown in FIG. 6D. If, however, they come into contact with the line 66 drawn by the moving body 44 that is the player's own vehicle, as shown in FIG. 6E, they chase at high speed after the moving body 44 along the line 66, as shown in FIG. 6F. When the moving body 44 comes into contact with an enemy, it explodes. The game is over when there is no spare vehicle or the time limit has expired.

Figure 7A:
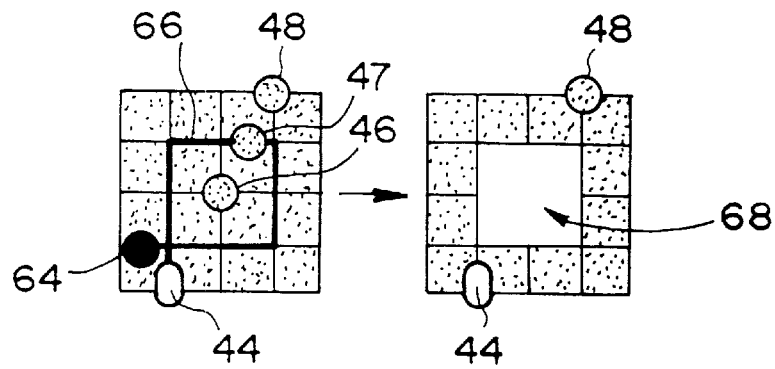
FIGS. 7A to 7D are views illustrative of changes in image information within regions specified by the movement of the moving body.

On the other hand, as shown in FIG. 7A, when a closed region is specified by a boundary formed by the line 66 that is the movement track of the moving body 44 crossing across that same line 66, and the player releases the button, the polygons in that region 68 are set to non-display. This enables the player to see an image of the three-dimensional object 40 (see FIG. 5) that was hidden by the polygons disposed within the region 68. Note that the enemy moving bodies 46 and 47 that were on this region 68 and the line 66 at the time at which the player released the button also disappear.

Figure 7B:
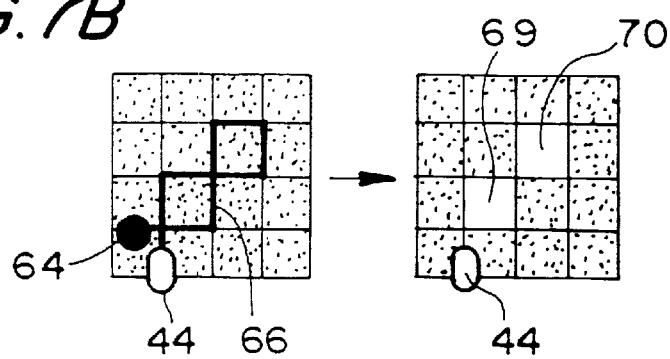
Figure 7C:
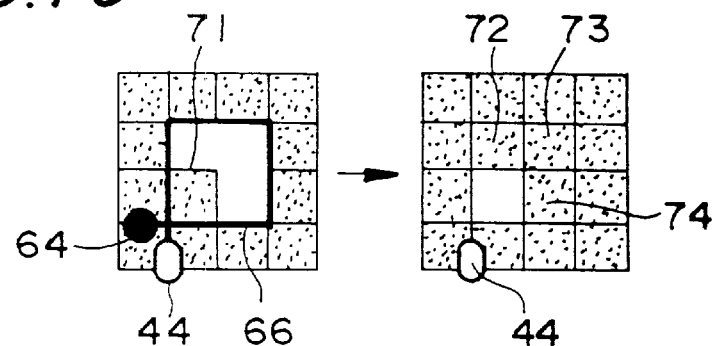
Figure 7D:
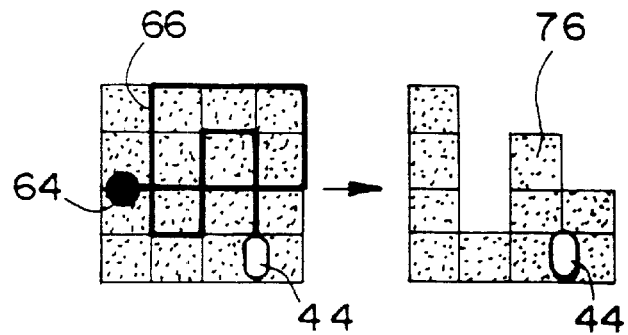

If a line 66 such as that shown in FIG. 7B is drawn in this embodiment, polygons disposed within regions 69 and 70 are set to non-display. When the line 66 is drawn as shown in FIG. 7C, a polygon 71 is switched from display to non-display, and polygons 72, 73, and 74 are switched from non-display to display. A polygon 76 of FIG. 7D is considered to be surrounded twice by the line 66, so the display state thereof is maintained.

Note that the image information changing section 120 could be designed to change an image within at least a specified region. For example, if there are more polygons in regions disposed outside of a specified region than polygons disposed within that specified region, the display/non-display of the polygons in regions outside the specified region could be switched.

Figure 8A:
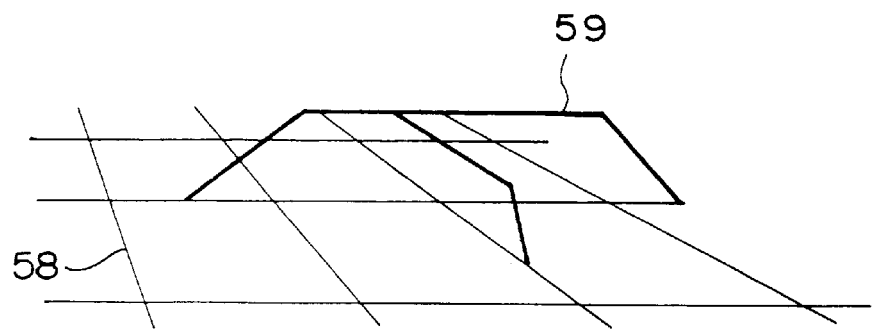
FIGS. 8A and 8B are views illustrative of a bypass.
Figure 8B:
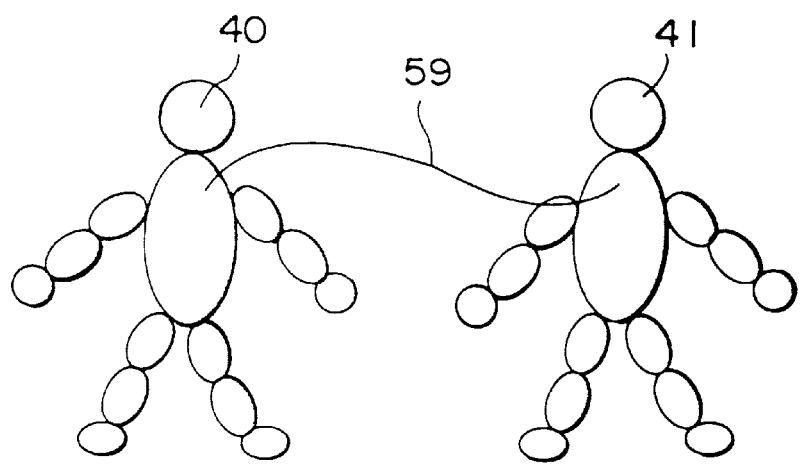
Figure 8C:
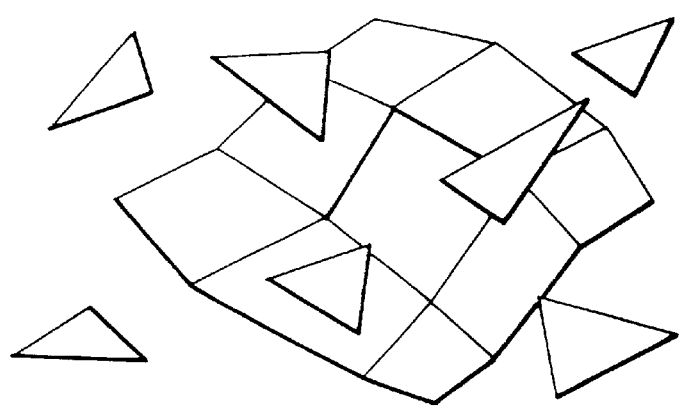
FIG. 8C is a view illustrating a dramatic presentation used when eliminating a polygon.

Similarly, a bypass 59 could be provided for the field frame 58, as shown in FIG. 8A. The configuration could be such that it is possible to use this bypass 59 to move between the two three-dimensional objects 40 and 41, as shown in FIG. 8B. Furthermore, to increase the dramatic effect, a polygon which has been set to non-display could fly away in fragments, as shown in FIG. 8C.

Figures 9A, 9B:
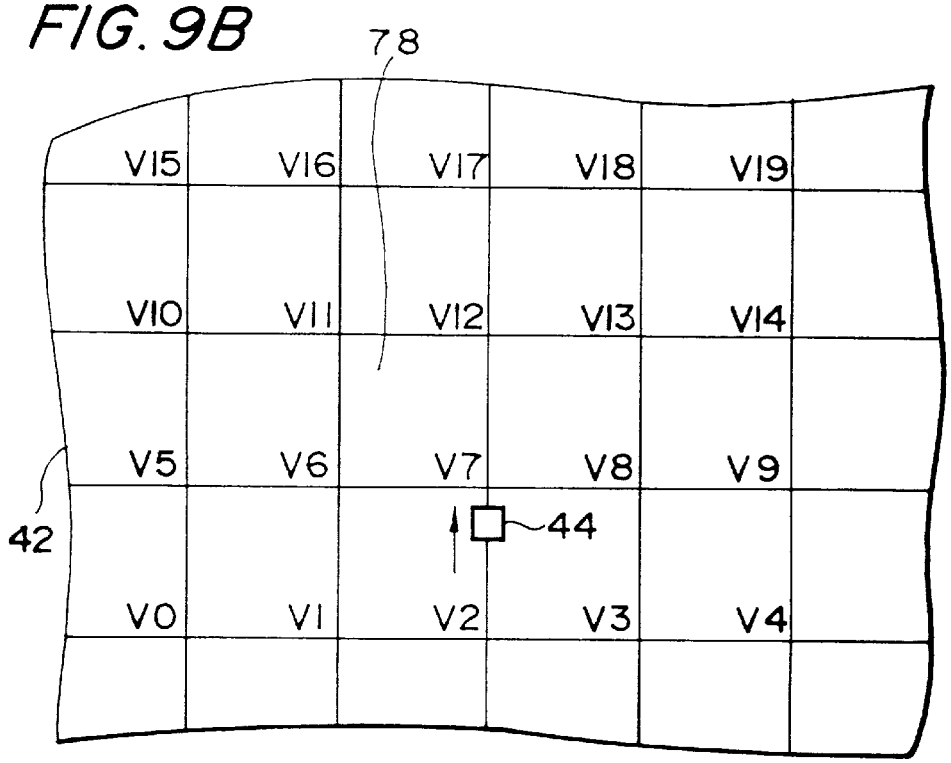
FIGS. 9A and 9B are views illustrative of a vertex relationship list as well as a method of moving the moving body on the edge of a polygon.

The description now turns to an example of the method of moving the moving body over the covering object. With this embodiment, if the covering object is formed of polygons, computations for moving the moving body on the edge of a polygon is done on the basis of vertex position information for the polygon. For that purpose, this embodiment uses a vertex relationship list such as that shown in FIG. 9A. this vertex relationship list has storage areas for each of the vertices of the polygons configuring the covering object. Each storage area contains data such as a vertex index for referencing that vertex, position information for that vertex in a world (absolute) coordinate system, and the indices of the vertices that are the upper neighbor, left-hand neighbor, lower neighbor, and right-hand neighbor of that vertex. If a vertex V7 in FIG. 9B is taken as an example, the vertex relationship list contains an index V7, position information $(X_{V7}, Y_{V7}, Z_{V7})$, and indices V2, V6, V12, and V8 for the vertices that are the upper neighbor, left-hand neighbor, lower neighbor, and right-hand neighbor of the vertex V7. The thus-configured vertex relationship list can be created easily from a vortex position list (shown in FIG. 10B) that is one item of object information.

Consider a case in which the moving body 44 is moving towards the vertex V7, as shown in FIG. 9B. At this point, the moving body computation section 110 of FIG. 1 detects in which direction the joystick has been pushed, when the moving body 44 has arrived at V7 or at a time that is a given time before the arrival time. In this case, the determination of whether or not the moving body 44 has reached V7 is based on position information for vertices V2 and V7, stored in the storage areas for vertices V2 and V7 in the vertex relationship list. If, for example, the joystick has been pushed to the left at the detection, the moving body computation section 110 reads the index for the vertex that is the left-hand neighbor, from the storage area for the vertex V7 in the vertex relationship list. Since the vertex index for the left-hand neighbor is V6 in this case, the moving body computation section 110 then reads position information for the vertex V6 from the storage area for the vertex V6 in the vertex relationship list. The track along which the moving body 44 is supposed to move is obtained from the position information for vertices V6 and V7, and computations for the movement of the moving body 44 along this track are performed every given infinitesimal time (such as every ¹⁄₆₀ second). The position information in the world coordinate system of the moving body 44 moving along this track is sequentially output to the object space setting section 140. The object space setting section 140 performs processing to set the disposition within the object space of a plurality of objects that comprise the moving body 44. The image synthesis section 200 synthesizes an image on the basis of this setting information. In this manner, an image can be obtained of the moving body 44 moving along the field frame that is the edge of the polygon.

If the joystick has been pushed to the right at the arrival time to the vertex V7 or a given time before that, the storage area for vertex V8 is read; if it has not been pushed to either the right or left, the storage area for vertex V12 is read; then processing similar to that described above is performed. The processing for moving the enemy moving bodies can be performed in a manner similar to that for the player's own vehicle.

With the thus-configured embodiment, the moving bodies are moved along the edges of the polygons by using the vertex position information of the polygons, making it possible to use a simple process and a small amount of data to move the moving bodies over the covering object. This is particularly advantageous in that the vertex relationship list of FIG. 9A can be created easily from the vertex position list for the covering object (see FIG. 10B), or data can be used in common between the lists.

The description now turns to the processing of changing the image information by the image information changing section 120. In this embodiment, the image information changing section 120 processes the switching of the display/non-display of polygons that form the specified region of the covering object.

Figures 10A, 10B, 10C:
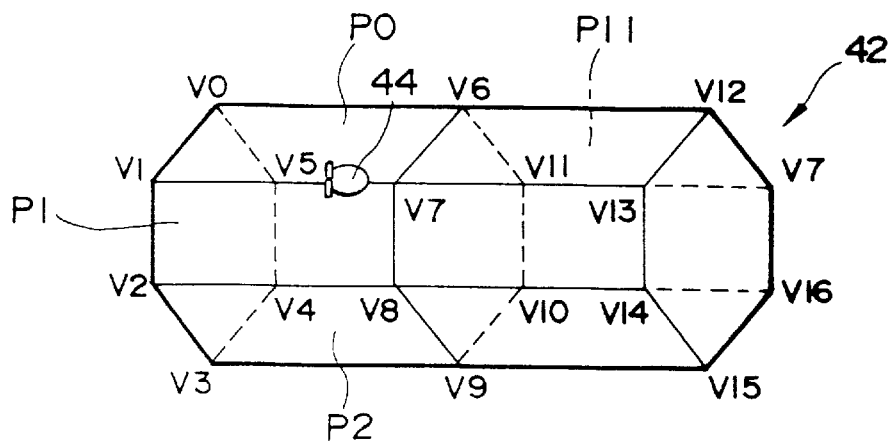
FIGS. 10A to 10C are views illustrative of a vertex position list, a polygon information list, and a method of switching the display/non-display of polygons and changing the texture coordinates and translucency thereof.

An example of the covering object 42 is shown in FIG. 10A. In this example, the covering object 42 is configured of 12 polygons. To display this covering object 42, the object space setting section 140 creates the vertex position list of FIG. 10B and a polygon information list shown in FIG. 10C, then outputs these lists to the image synthesis section 200. Objects other than the covering object are handled in a similar manner. In this case, the vertex position list has storage areas for each of the vertices of the polygons configuring the object, as shown in FIG. 10B. Each storage area contains an index for referencing that vertex and position information in the world coordinate system for that vertex. The polygon information list has storage areas for each of the polygons configuring the object, as shown in FIG. 10C. Each storage area contains polygon information which comprises identification information for that polygon, sequence information for the vertex indices for that polygon, coordinates in a texture space of a texture to be mapped to that polygon, and the translucency to which that polygon is set. If a polygon P0 is taken as an example, the vertex index sequence information therefor is V0-V1-V7-V6, and the position information of the vertices configuring the polygon P0 can be specified by referencing the vertex position list of FIG. 10B on the basis of this sequence information. The texture coordinates of the polygon P0 are $(U_{0(P0)}, V_{0(P0)})$ to $(U_{3(P0)}, V_{3(P0)})$, and a texture mapping section 202 within the image synthesis section 200 maps the texture onto the polygon P0 by reading texture information specified by these coordinates $(U_{0(P0)}, V_{0(P0)})$ to $(U_{3(P0)}, V_{3(P0)})$ from the texture information storage section 210. The translucency of the polygon P0 is TP0 and a translucency computation section 204 within the image synthesis section 200 can set the translucency of the polygon by performing given translucency computations using this TP0. The translucency computations are implemented by, for example, blending the color of the polygon in question with the color of a display object positioned behind that polygon.

Note that if brightness computations such as those for Gouraud shading are to be performed, vertex normal vector information or vertex brightness information (or an index thereof) could be included within the polygon information.

The processing for switching a polygon that forms a specified region of the covering object from display to non-display could be implemented by deleting from the polygon information list of FIG. 10C the storage areas of polygons that are set to non-display. If, for example, a moving body moves along the edge of a polygon and it has been determined that the polygon P1 has been set to non-display, the storage area for the polygon P1 is deleted from the polygon information list of FIG. 10C. This means that the image synthesis of the polygon P1 is omitted by the image synthesis section 200, enabling the non-display of the polygon P1.

Figure 11A:
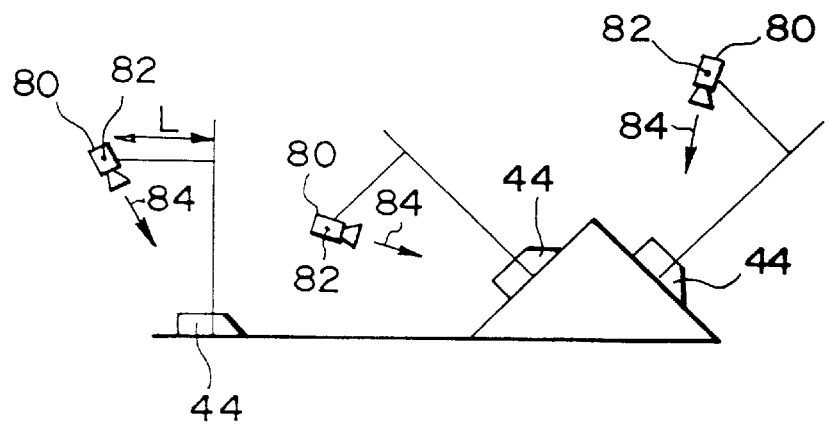
FIGS. 11A to 11C are views illustrative of the setting of viewpoint and line-of-sight direction.

The setting of the viewpoint and line-of-sight direction will now be described. With this embodiment, viewpoint and line-of-sight direction are set to follow the movement of the moving body around the covering object. This setting is performed by the viewpoint setting section 130 of FIG. 1 on the basis of position information of the moving body, which is obtained by the moving body computation section 110. A viewpoint 82 in FIG. 11A is the position of a virtual camera 80 and a line-of-sight direction 84 is the direction in which the virtual camera 80 is pointing. The display section 10 displays a field-of-view image from this viewpoint 82 and in the line-of-sight direction 84 (see FIG. 2B). It should be noted, however, that inertia is assumed to operate with respect to the movement of the virtual camera 80, so that the viewpoint 82 of FIG. 11A is a target viewpoint when the action of inertia is ignored. This target viewpoint is set to a position that is shifted from directly above the moving body 44 that is the player's own vehicle by a distance L in the direction opposite to the direction of advance, as shown in FIG. 11A.

Figure 11B:
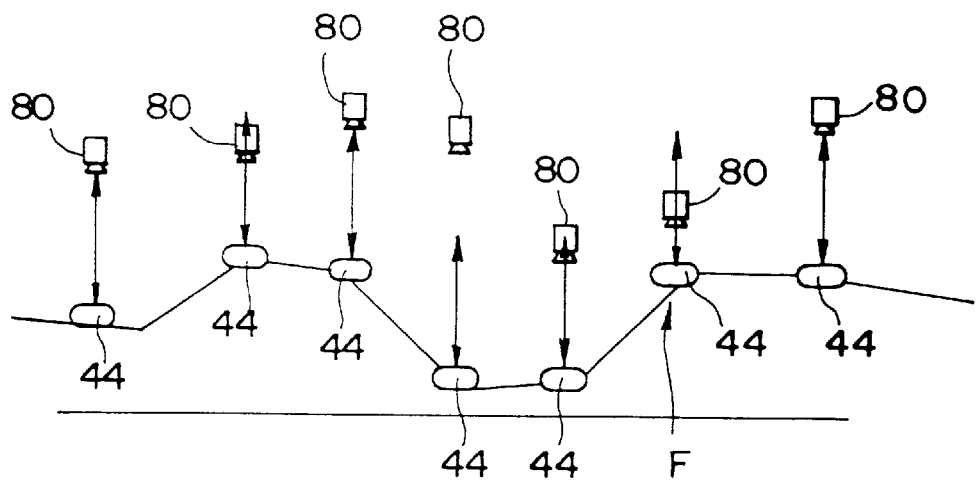

The virtual camera 80 moves while maintaining a constant height from the moving body 44 that is the player's own vehicle, as shown in FIG. 11B. This height is taken to be a target viewpoint height. Inertia is also assumed to act with respect to the movement of the virtual camera 80 in the height-wise direction. This makes it possible for the virtual camera 80 to move smoothly when the moving body 44 moves over a game field having height differences, as shown at F in FIG. 11B.

Figure 11C:
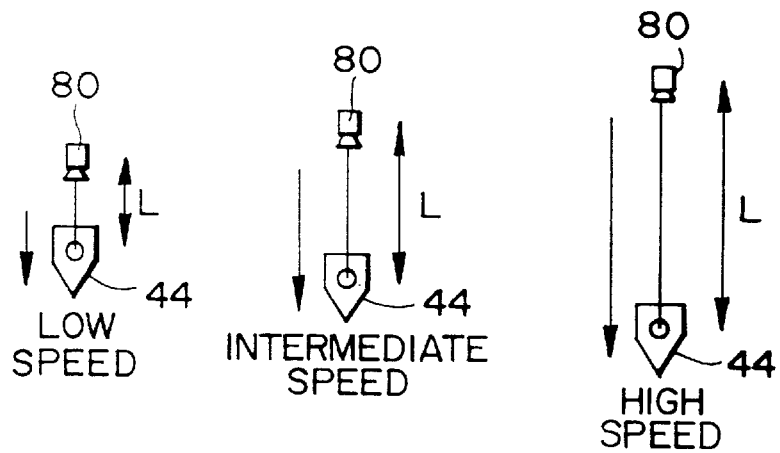

The speed of the moving body 44 of this embodiment is low when the joystick is pushed down, high when it is pushed up, and intermediate when nothing is done (or the movement is downward when the joystick is pushed down, upward when it is pushed up, and it stops when nothing is done). The distance L (see FIG. 11A) between the position directly above the moving body and the target viewpoint varies according to whether the speed of the moving body 44 is low, intermediate, or high, as shown in FIG. 11C. The camera 80 is left behind the moving body 44 when the moving body 44 is moving at high speed. A field-of-view image is synthesized for a position closer to directly above the moving body 44 when it is moving at low speed.

The viewpoint and line-of-sight direction for creating the field-of-view image follow the movement of the moving body in the thus configured embodiment. The viewpoint and line-of-sight direction are set to a position at which at least part of the change in the image of the region 36 specified by the movement of the moving body 44 is visible, as shown in FIG. 2B. This enables the player to specify any region that the player desires, by operating the moving body 44, and enjoy the changes in the image of the thus specified region. In the example of FIG. 2B, it is possible to obtain the pleasure of seeing portions of the three-dimensional object that were hidden by the polygons of the region 36, by setting the polygons within the region 36 to non-display. The viewpoint and line-of-sight direction follow this movement of the moving body 44, regardless of the position on the three-dimensionally shaped covering object 42 that the moving body 44 moves to. As a result, the player can enjoy a situation in which portions of the three-dimensional object 40 that were hidden by the covering object 42 gradually become visible, and moreover the images displayed during this time are three-dimensional image, enabling a greater increase in the enjoyment of the game.

Figure 12A:
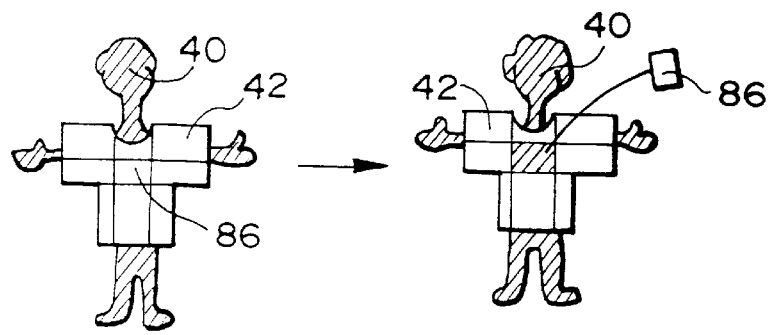
FIGS. 12A to 12B are views illustrative of the method of changing image information of the covering object.

The description above concerned a method of setting polygons to non-display in a region that is specified by the movement of the moving body, as an example of the change of image information in the specified region. This method deletes a polygon 86, which is one of the polygons (or curved surfaces) configuring the covering object 42 that covers the three-dimensional object 40, as shown in FIG. 12A. This makes it possible to see an image of a three-dimensional object in a portion that was hidden by the polygon 86 of the specified region. The display/non-display switching of the polygon 86 could be implemented by the image information changing section 120 of FIG. 1 deleting or creating polygon information for the polygon 86 from the polygon information list of FIG. 10C, as previously described.

However, various other methods can be considered for the method of changing image information.

Figure 12B:
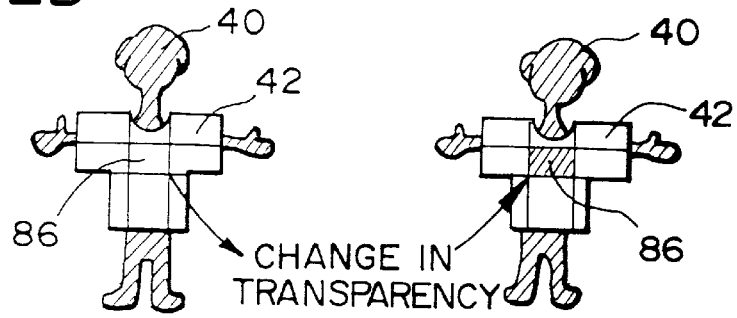

For example, the method of changing image information shown in FIG. 12B could be used to change the translucency of (or make transparent) the polygon 86 disposed in the specified region, among the polygons (or curved surfaces) configuring the covering object. With this method too, an image of the three-dimensional object 40 can be made visible in a portion that was hidden by the polygon 86. A particularly outstanding visual effect that is greater than that of FIG. 12A can be obtained by gradually changing the translucency from non-transparent towards transparent. This change in translucency can be implemented by the image information changing section 120 changing the translucency that is comprised within the polygon information for the polygon 86 in the polygon information list of FIG. 1C, for example.

Figure 12C:
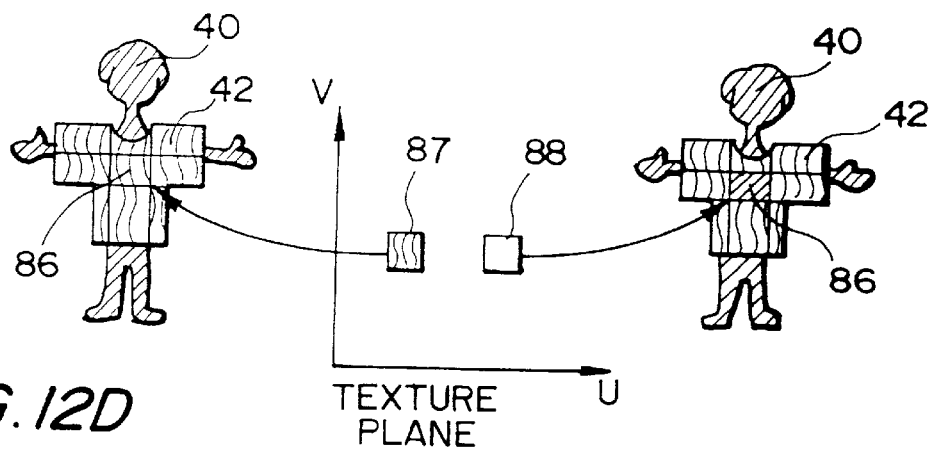

Another method of changing image information that is shown in FIG. 12C changes the texture coordinates that specify a texture to be mapped onto the polygon (or curved surface) 86 of the covering object 42 in the specified region, from texture coordinates that specify a texture 87 to texture coordinates that specify a texture 88. In this case, the texture 88 is a transparent or translucent texture. An image of the three-dimensional object 40 can be made visible in a portion that was hidden by the polygon 86 by mapping this transparent or translucent texture 88 onto the polygon 86 which was previously mapped with the non-transparent texture 87. Note that it is not necessary for all of the texture 88 to be transparent or translucent; only a part thereof could be transparent or translucent. The change in texture to be mapped onto the polygon could be implemented by the image information changing section 120 changing the texture coordinates (UV coordinates within a texture plane, giving addresses that contain texture information in the texture information storage section 210) that are comprised within the polygon information for the polygon 86 in the polygon information list of FIG. 10C.

Figure 12D:
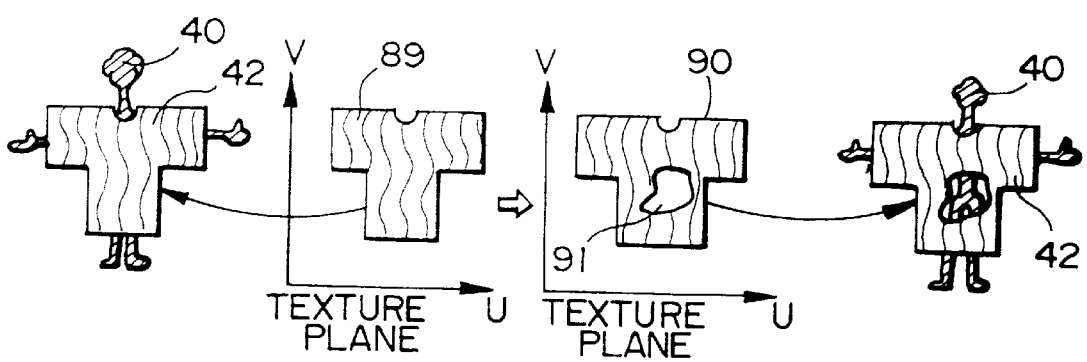

A further method of changing image information shown in FIG. 12D redraws the texture itself that is mapped onto all or part of the covering object 42, from a texture 89 to a texture 90. The texture 90 overwrites the texture 89 so that the portion of the region 91 becomes transparent or translucent. An image of the three-dimensional object 40 can be made visible in a portion corresponding to the region 91 by mapping this texture 90 onto the covering object 42. This redrawing of the texture to be mapped onto the covering object 42 could be implemented by the image information changing section 120 overwriting details of the texture information that is stored in the texture information storage section 210 within memory, such as RAM. In other words, the texture that is stored at the texture coordinates position allocated to the covering object 42 is overwritten from the texture 89 to the texture 90. This method differs from those of FIG. 12A to FIG. 12C in that the change of image information is not necessarily limited to a single polygon. This means that the moving body can move to any position on the covering object 42, not just along the edge of a polygon, and the image information for the region specified by that movement can be changed, for example.

In the above description, image information of a covering object that covers a three-dimensional object was changed, but it is also possible to not provide a covering object of this type and change the image information for the three-dimensional object itself.

Figure 13A:
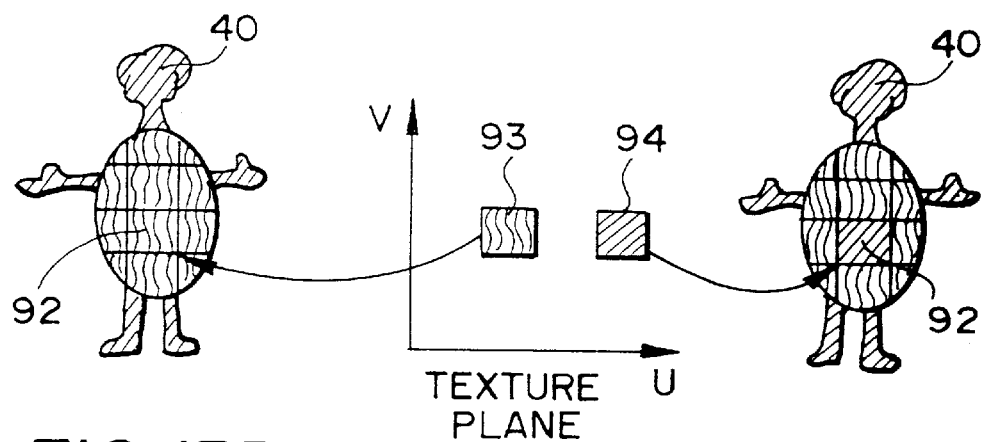
FIGS. 13A and 13B are views illustrative of the method of changing image information of the three-dimensional object.

For example, a method of changing image information shown in FIG. 13A changes the texture coordinates that specify a texture to be mapped onto a polygon (or curved surface) 92 of the three-dimensional object 40, from texture coordinates that specify a texture 93 to texture coordinates that specify a texture 94. In this case, the texture 93 is similar to the texture mapped onto the polygon 86 of the covering object 42 of FIG. 12C. The texture 94 represents the image of the three-dimensional object 40 that is visible when the polygon 86 of FIG. 12C is made transparent or translucent. Using the situation shown in FIG. 2B as an example, the pattern of the covering object 42 becomes the texture 93 and an image of the three-dimensional object 40 that is visible when the polygons in the region 36 are set to non-display, in other words, the cow-hide pattern in the region 36, becomes the texture 94. Use of this method makes it possible to achieve substantially the same visual effect as that obtained by setting the polygons of the covering object to non-display, changing the translucency of those polygons, or changing a texture mapped onto the covering object. The change of texture to be mapped onto the polygon 92 could be implemented by the image information changing section 120 changing the texture coordinates that are comprised within the polygon information for the polygon 92 in the polygon information list of FIG. 10C, for example.

Figure 13B:
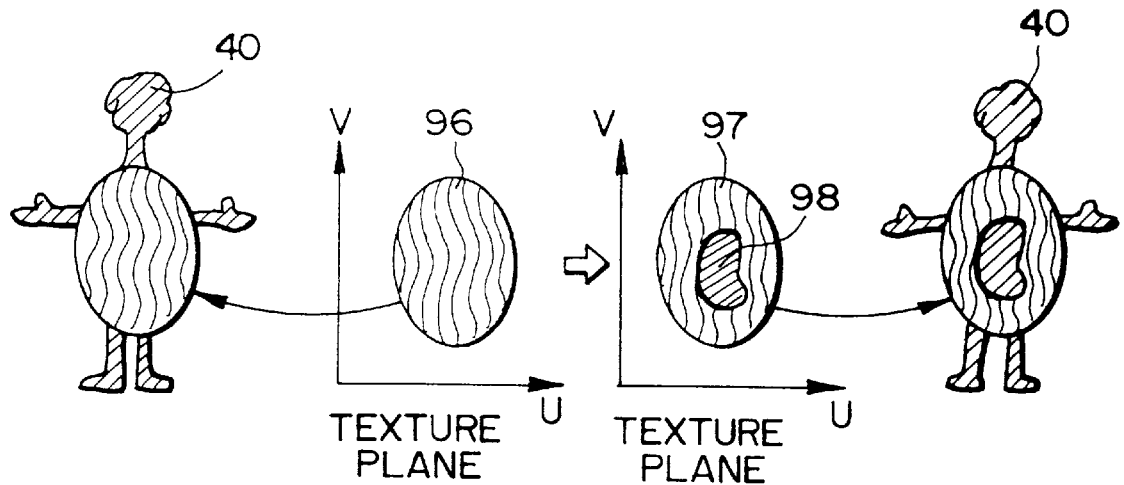

Another method of changing image information shown in FIG. 13B changes the texture itself that is mapped onto all or part of the three-dimensional object 40, from a texture 96 to a texture 97. The textures 96 and 97 differ in the image of a region 98 therein. The region 98 is overwritten in a similar manner to that of the image of the three-dimensional object 40 that is seen when the region 91 of FIG. 12D becomes transparent or translucent, for example. Using the situation shown in FIG. 2B as an example, the texture in the region 98 is overwritten by a pattern representing the cow's hide. This makes it possible to achieve substantially the same visual effect as that obtained when the polygons of the covering object are set to non-display. The overwriting of the texture to be mapped onto the three-dimensional object 40 could be implemented by the image information changing section 120 overwriting the details of the texture information that is stored in the texture information storage section 210 within memory, such as RAM. This method differs from that of FIG. 13A in that the change of image information is not necessarily limited to a single polygon. This means that the moving body can move to any position on the covering object 42, not just along the edge of a polygon, and the image information for the region specified by that movement can be changed, for example.

Note that the methods of changing the image information of the covering object that are shown in FIGS. 12A to 12D have the following advantages:

(1) They are applicable even when the shape of the three-dimensional object and the shape of the covering object are different.

(2) Various different images can be obtained by combining a plurality of covering objects with one three-dimensional object (the three-dimensional object can be used in common).

(3) Image information can be changed simply by switching the display/non-display state of the polygons (or curved surfaces) configuring the covering object.

On the other hand, the methods of changing the image information of the three-dimensional object that are shown in FIGS. 13A and 13B have the following advantages:

(4) The quantity of data can be reduced because the covering object is not necessary.

(5) These methods can be applied to devices that have no transparent and translucent functions.

Figure 14:
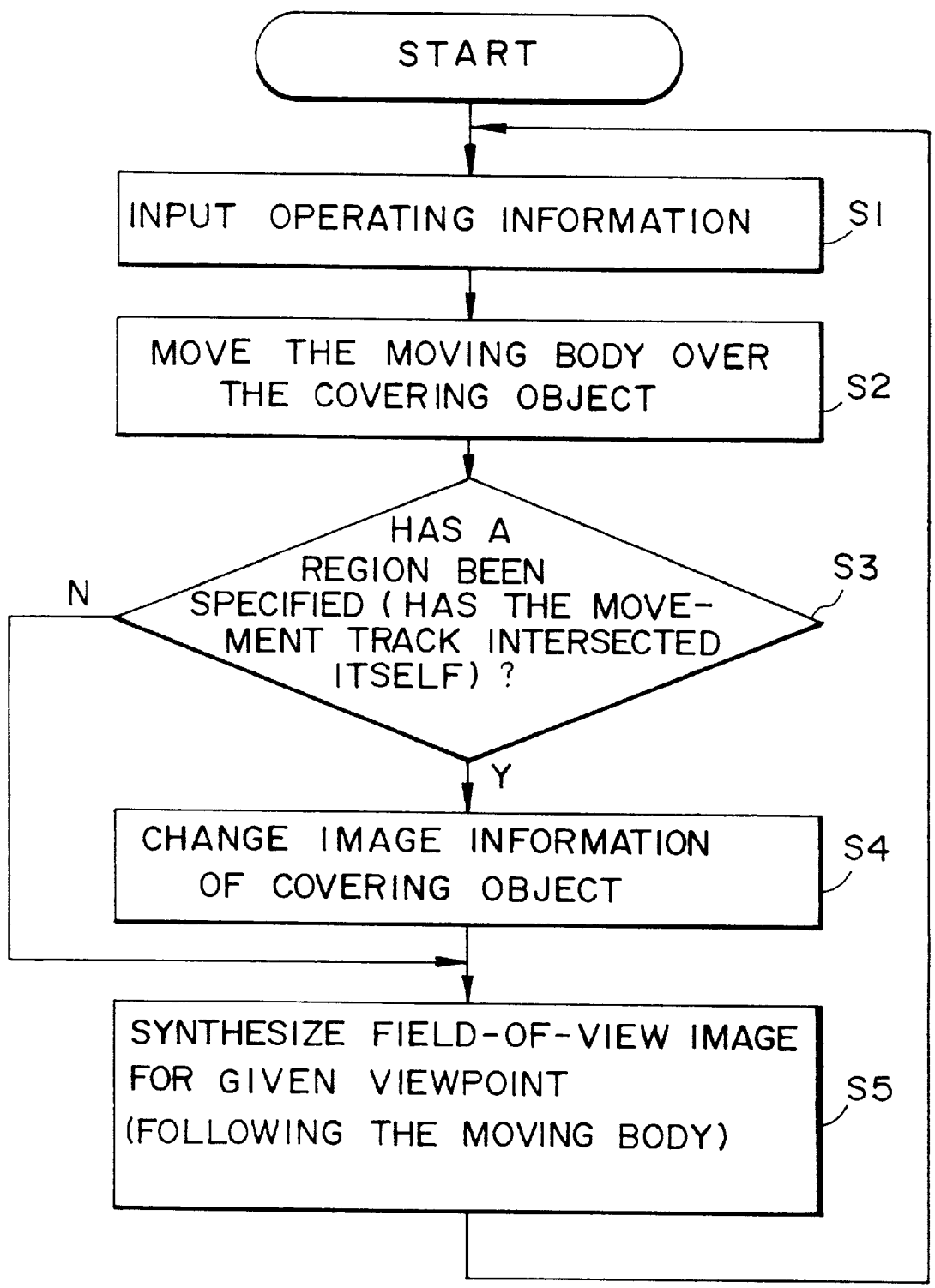
FIG. 14 is a flowchart illustrating the operation of Embodiment 1.

The operation of this embodiment will now be described with reference to the flowcharts of FIGS. 14 and 15. The flowchart of FIG. 14 corresponds to the method of FIGS. 12A to 12D. First of all, the player inputs operating information through the operation section 12 and processing is performed to cause the moving body to move over the covering object on the basis of this operating information (steps S1 and S2). If the moving body is moved on the edge of a polygon, processing is performed using the vertex position information for the polygon, as described previously with reference to FIGS. 9A and 9B. A determination is then made as to whether or not a region has been specified by the movement of the moving body (step S3). Taking FIGS. 7A to 7D as an example, a closed region bounded by the movement track of the moving body intersecting itself is specified. If such a region is specified, the image information of the covering object is changed by one of the methods shown in FIGS. 12A to 12D (step S4). A field-of-view image is synthesized for a given viewpoint and line-of-sight direction, such as a viewpoint and line-of-sight direction that follows the moving body (step S5).

Figure 15:
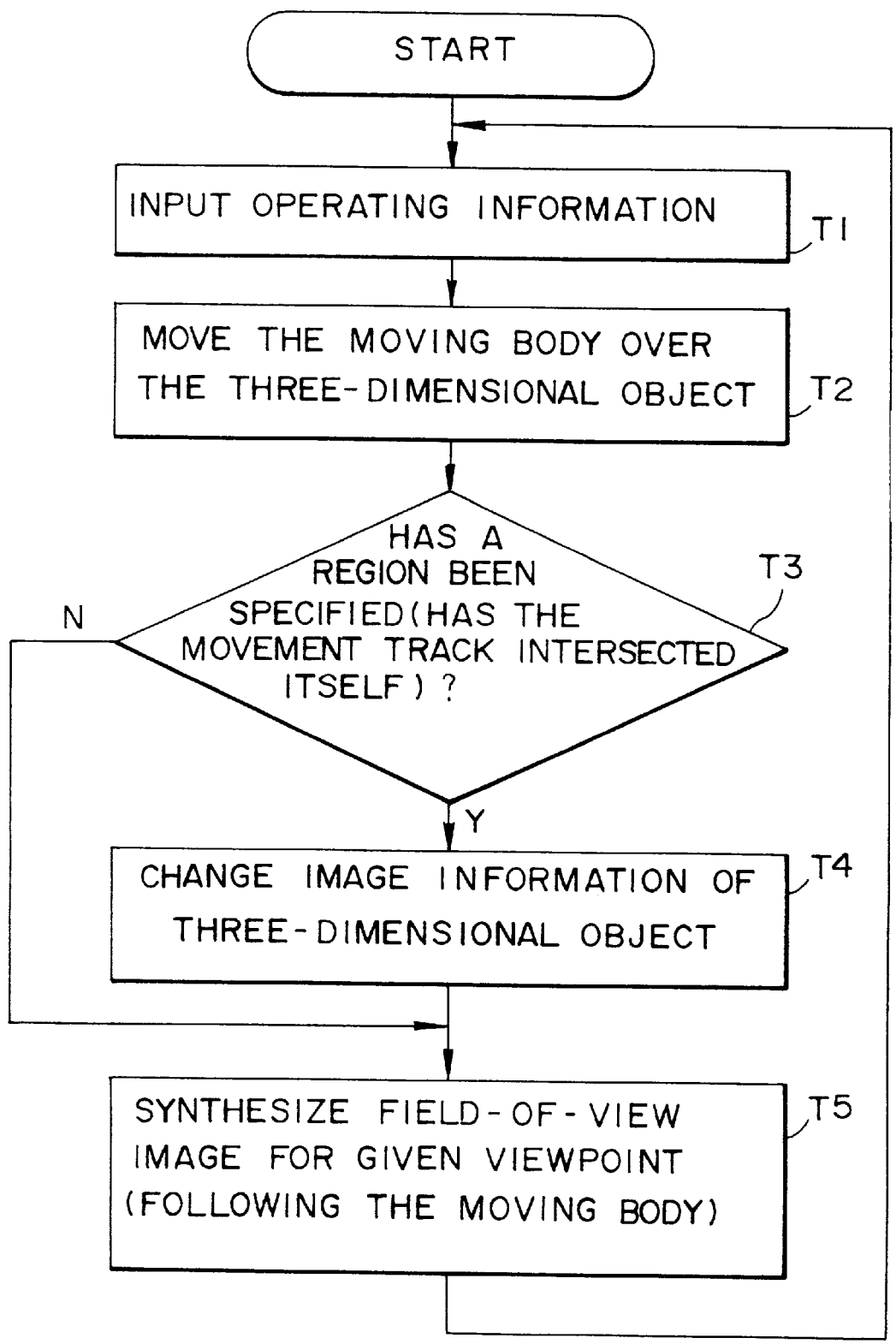
FIG. 15 is a flowchart illustrating the operation of Embodiment 1.

The flowchart of FIG. 15 corresponds to the method of FIGS. 13A and 13B. This differs from FIG. 14 in a step T2 in which the moving body is moved over the three-dimensional object, not the covering object, and a step T4 in which the image information of the three-dimensional object is changed, not that of the covering object.

Embodiment 2

Figure 16A:
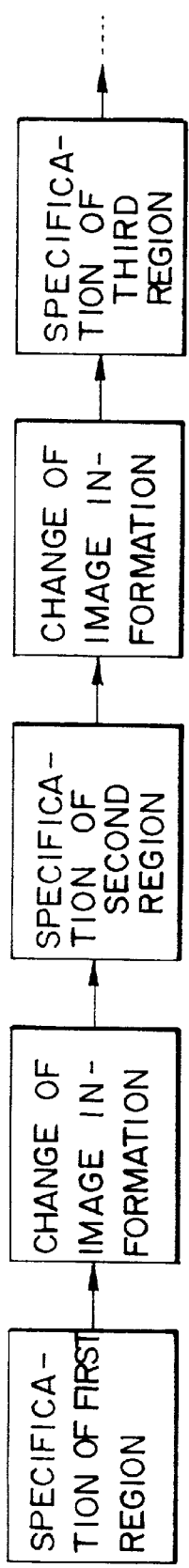
FIGS. 16A to 16D are views illustrative of the method of Embodiment 2.

In Embodiment 1, a game-clear condition was satisfied by specifying one region among a plurality of regions and image information was changed every time a region was specified (every time a game-clear condition was satisfied), as shown in FIG. 16A. In other words, if a first region in which is disposed a first polygon is specified, that first polygon is set to non-display, and if a second region in which is disposed a second polygon is specified, that second polygon is set to non-display.

Figure 16B:
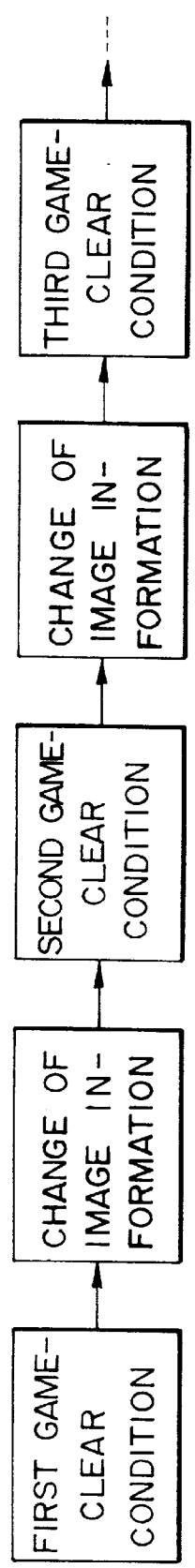

With the present invention, the image information of the covering object or three-dimensional object is gradually changed every time a game-clear condition is satisfied, as shown in FIG. 16B. Various different conditions can be considered as game-clear conditions in this case, and some of these different game-clear conditions are described below with reference to Embodiment 2.

Figure 16C:
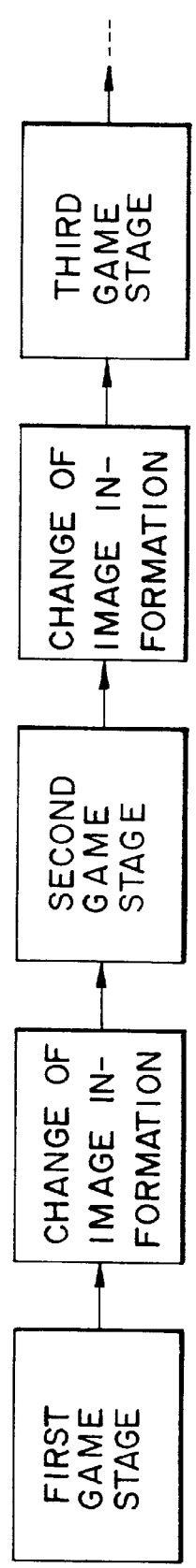
Figure 17A:
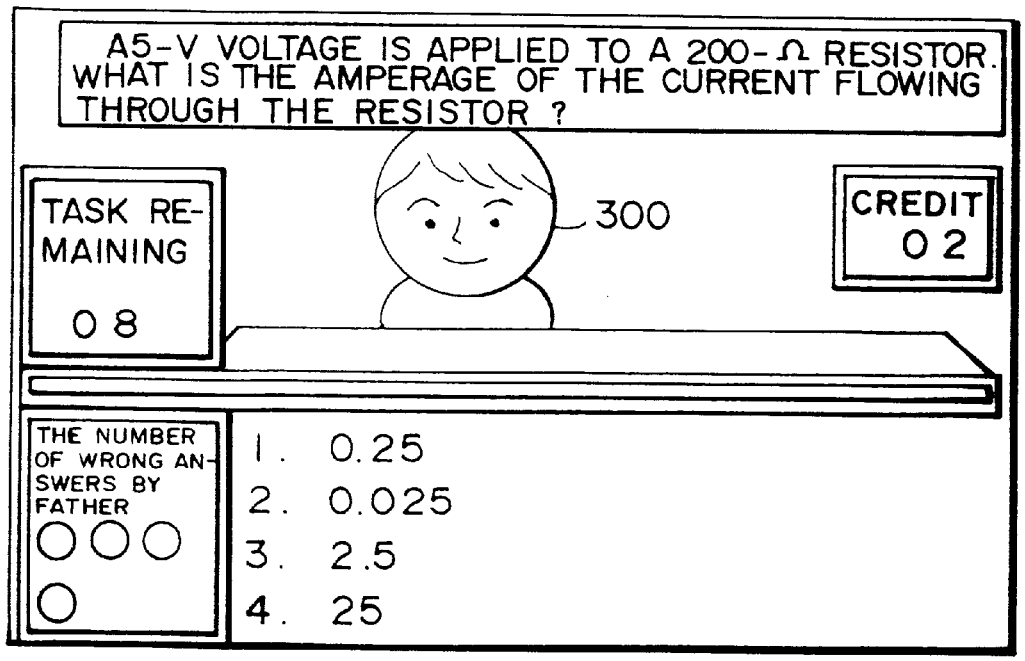
FIGS. 17A and 17B show typical game images obtained when this invention is applied to a quiz game.
Figure 17B:
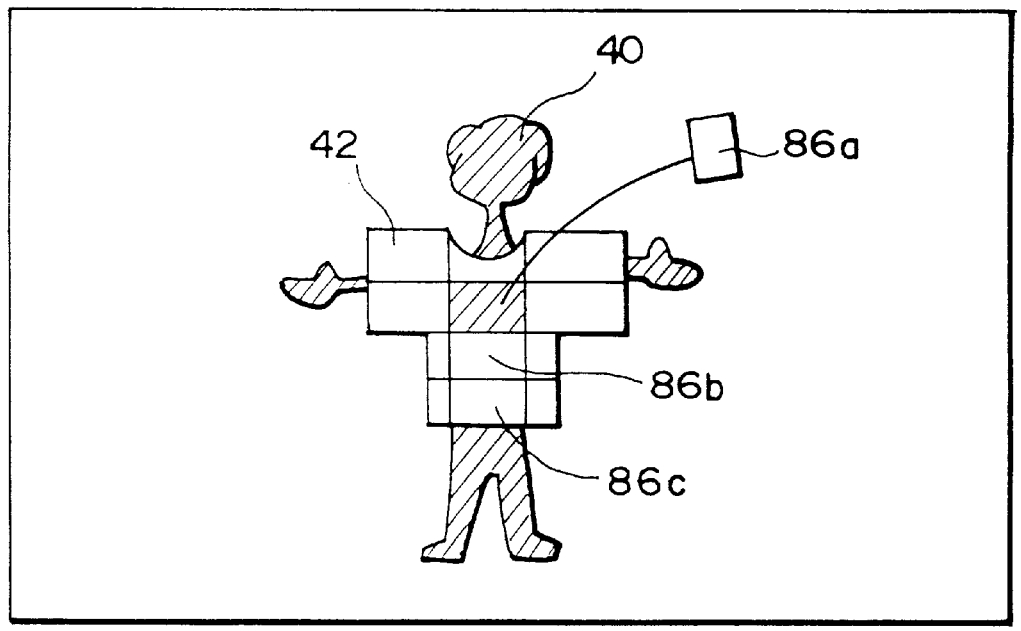

For example, typical game images obtained when this invention is applied to a quiz game are shown in FIGS. 17A and 17B. As shown in FIG. 17A, problems that are set for the player are displayed on the screen and the game progresses as the player answers these problems. If the player answers one or more of the problems that are set in a first game stage, a determination is made as to whether or not the first game stage has been cleared (whether or not a first game-clear condition has been satisfied) on the basis of a criterion such as the ratio of correct answers or the answer time. If it is cleared, image information change processing is performed to non-display a polygon (or curved surface) 86a of the covering object 42 that covers the three-dimensional object 40, for example, as shown in FIG. 17B. The flow then proceeds from the first game stage to a second game stage, as shown in FIG. 16C. In the second game stage too, one or more problems are set and a determination is made as to whether or not the second game stage has been cleared (whether or not a second game-clear condition has been satisfied) on the basis of the ratio of correct answers, etc. If it is cleared, another polygon 86b is set to non-display this time, for example, as shown in FIG. 17B. The flow proceeds to a third game stage and, if that is cleared, a polygon 86c is set to non-display, for example. In this manner, a polygon of the covering object 42 is set to non-display every time a game stage of this embodiment is cleared. This enables the player to enjoy an image of the three-dimensional object 40 that gradually becomes visible every time a game stage is cleared. As a result, the player will continue playing the game in order to see the completed state of the image that is gradually becoming visible. This makes it possible to encourage the player to continue playing.

Figure 18:
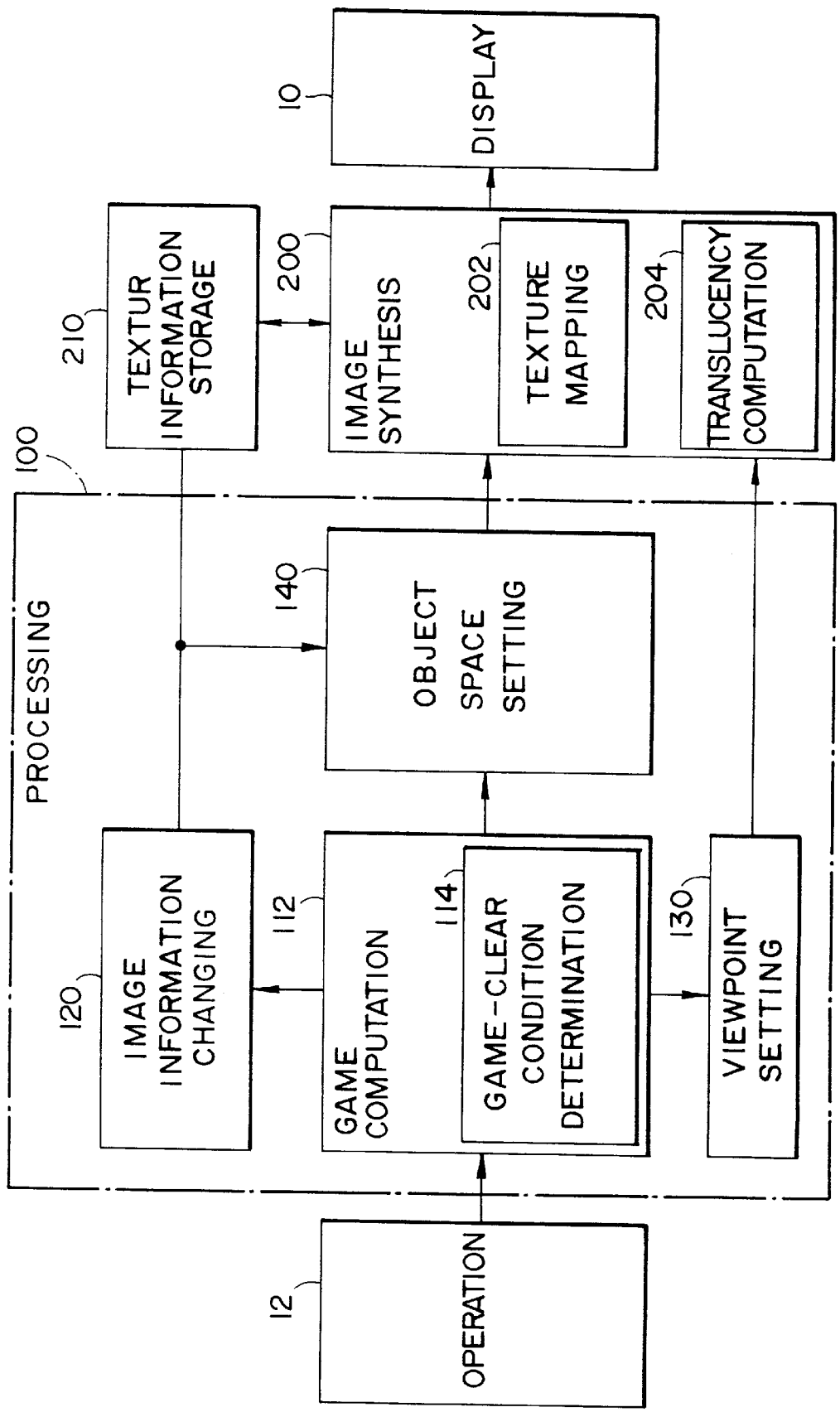
FIG. 18 shows a typical functional block diagram of Embodiment 2.

Note that a typical functional block diagram of a game machine in accordance with Embodiment 2 is shown in FIG. 18. Processing such as the setting of problems, the determination of whether or not answers are correct, and the setting of the images to be displayed is done by a game computation section 112. The determination as to whether or not a game stage has been cleared and game-clear condition has been satisfied is done by a game-clear condition determination section 114. Note that blocks in FIG. 18 that have the same functions as those in FIG. 1 are given the same reference numbers and further description thereof is omitted.

In FIG. 17B, changes of image information that switched the display/non-display state of polygons was performed, but the method of changing image information is not limited thereto and any of various other methods, such as those described with reference to FIGS. 12A to 12D, 13A, and 13B could be used instead.

Figure 16D:
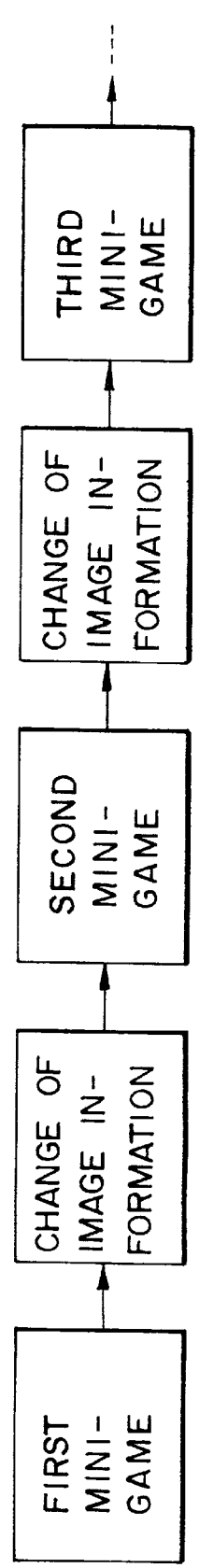
Figure 19A:
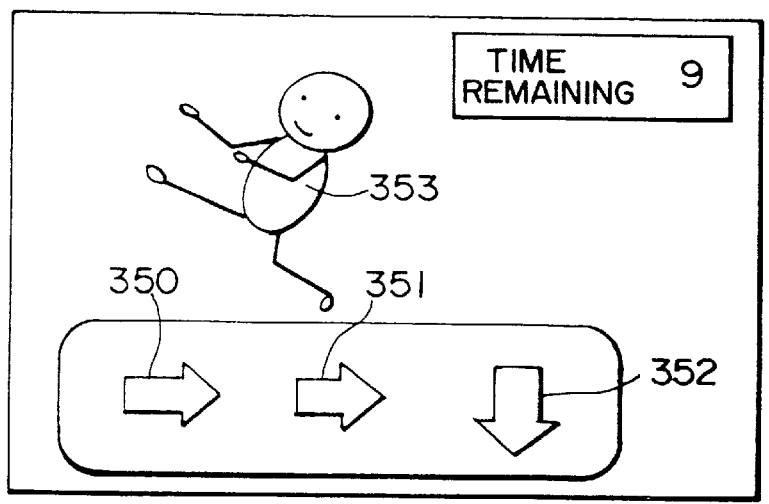
FIG. 19A to FIG. 19C show typical game images obtained when this invention is applied to a game having a plurality of mini-games.
Figure 19B:
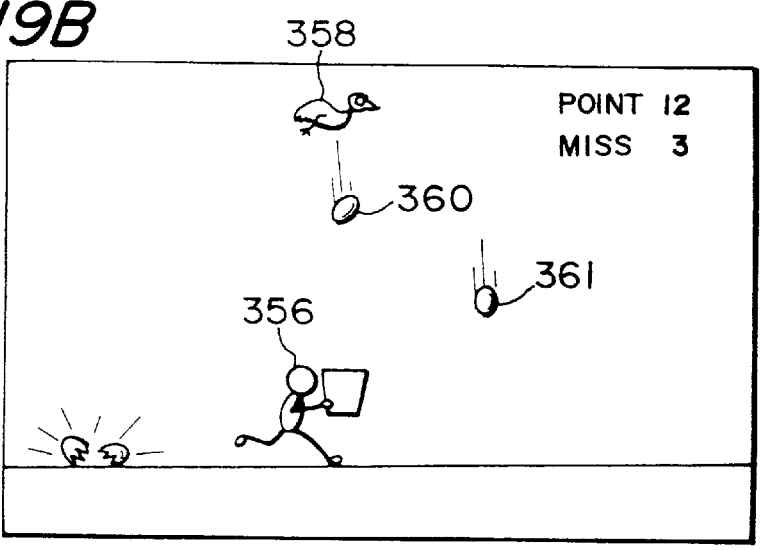
Figure 19C:
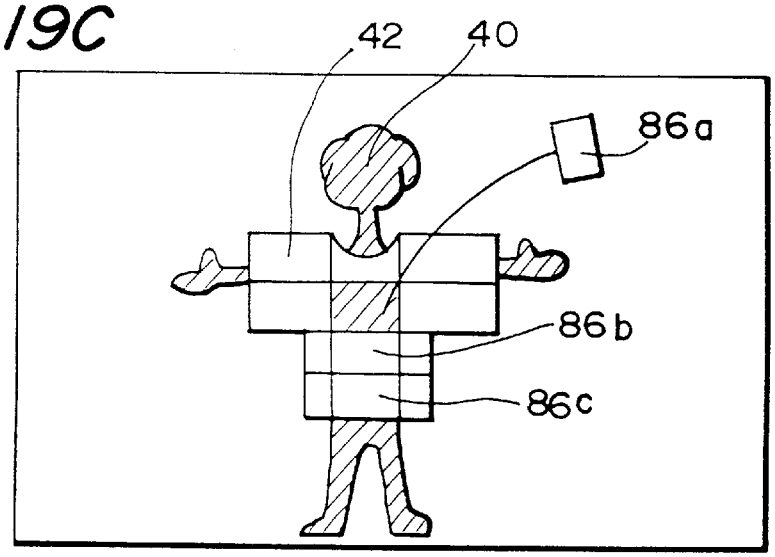

Typical game images obtained when this invention is applied to a game having a plurality of mini-games are shown in FIGS. 19A, 19B, and 19C. A first mini-game shown in FIG. 19A is a mini-game that is played within a time limit by pushing the joystick in directions indicated by arrows 350 to 352 on the screen. A game character 353 moves in accordance with the directions input by the player's manipulation of the joystick. The same-clear condition determination section 114 of FIG. 18 determines whether or not the first mini-game has been cleared (whether or not a first game-clear condition has been satisfied), on the basis of information of points obtained by the player in this first mini-game. If it has been cleared, a polygon (or curved surface) 86a shown in FIG. 19C is set to non-display. When the image information has been changed in this manner, the flow proceeds from the first mini-game to a second mini-game, as shown in FIG. 16D. A typical image of the second mini-game is shown in FIG. 19B. In this second mini-game, the player moves a game character 356 to left and right, to catch eggs 360 and 361 dropped by a bird 358 and ensure that they do not fall to the ground. In this second mini-game too, a determination is made as to whether or not the second mini-game has been cleared (whether or not a second game-clear condition has been satisfied), on the basis of a criterion such as the points obtained by the player. If it has been cleared, a polygon 86b is set to non-display, as shown in FIG. 19C. The flow then proceeds to a third mini-game and, if that is cleared, a polygon 86c is set to non-display. In this manner, one of the polygons configuring the covering object 42 of this embodiment is set to non-display every time a mini-game is cleared, encouraging the player to replay the game.

Figure 20A:
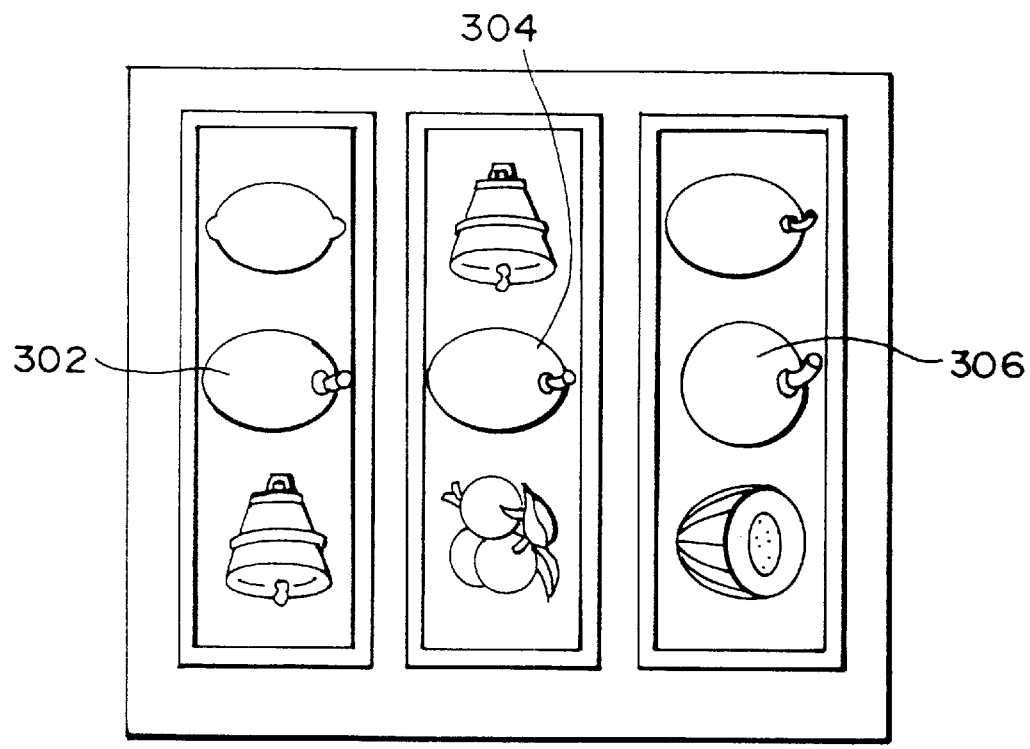
FIGS. 20A and 20B show typical game images obtained when this invention is applied to a slot-machine game
Figure 20B:
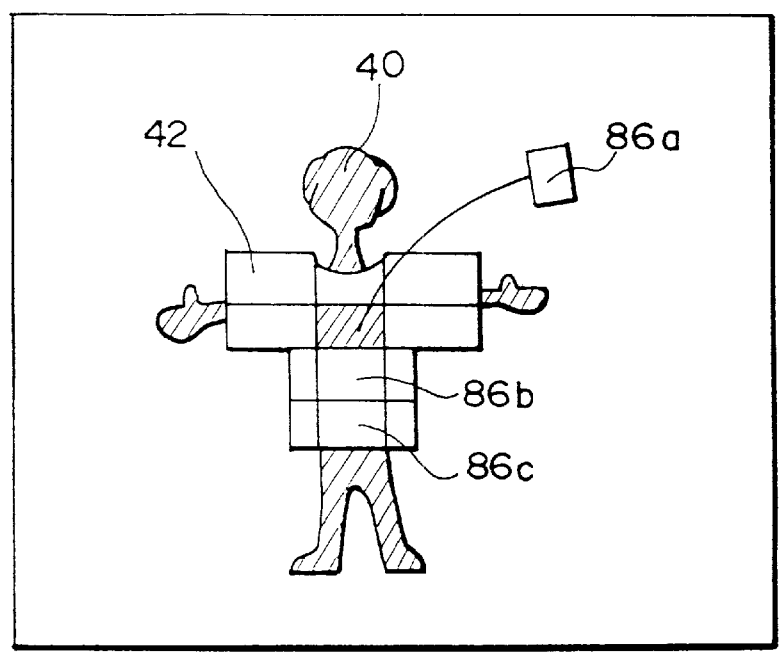

This invention can be applied to various games other than those described above. For example, typical images obtained when this invention is applied to a slot-machine game are shown in FIGS. 20A and 20B. In this example, symbols 302, 304, and 306 are to be lined up in the lateral direction, as shown in FIG. 20A, and this satisfies a game-clear condition. A polygon (or curved surface) 86a is then set to non-display, as shown in FIG. 20B. When the next game is played and the symbols are again lined up to satisfy the game-clear condition, a polygon 86b is set to non-display this time.

Figure 21A:
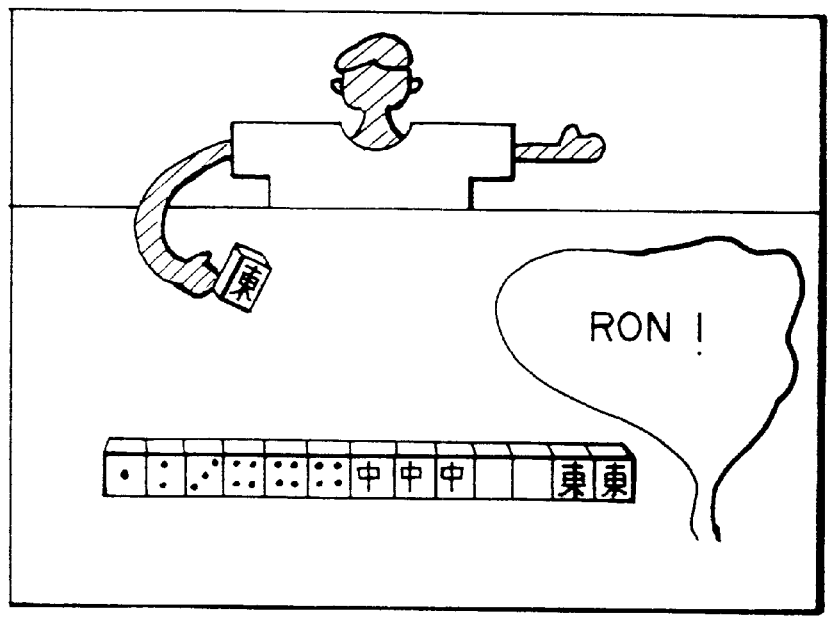
FIGS. 21A and 21B show typical game images obtained when this invention is applied to Mah-Jongg.
Figure 21B:
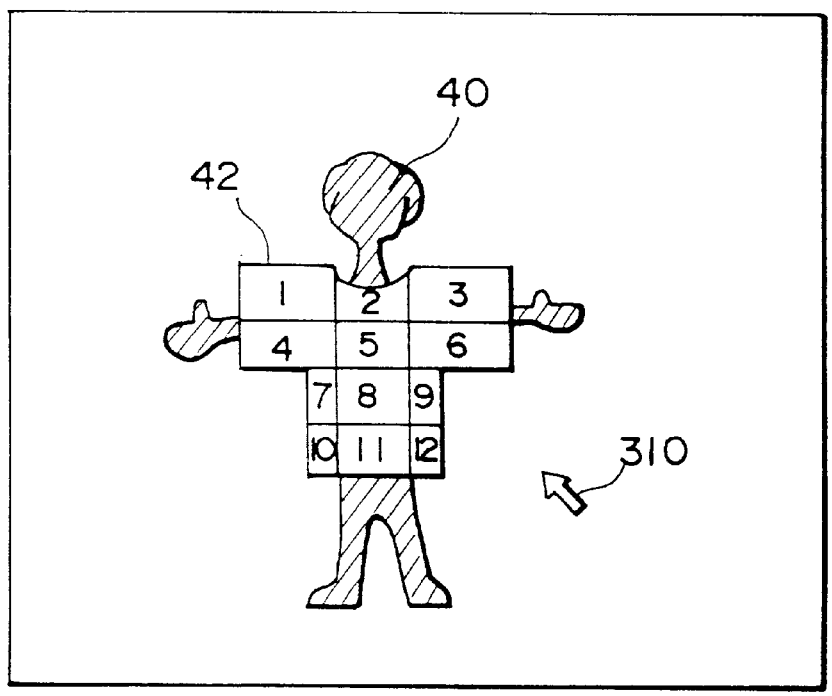

Typical images obtained when this invention is applied to a Mah-Jongg simulation are shown in FIGS. 21A and 21B. A game-clear condition is satisfied when an opposing game character that is manipulated by the computer discards a tile that makes a winning hand for the player and the player wins the game, as shown in FIG. 21A. In FIG. 21B, the three-dimensional object 40 representing the game character that discarded the winning tile, or the covering object 42, is subjected to the image change processing. In FIG. 21B, the game is configured so that the player can move a cursor 310 to select a polygon (or curved surface) to be set to non-display. Alternatively, each polygon could be given a number, and a polygon to be set to non-display could be specified by inputting this number at the start of a game or after the end thereof.

Note that the method of specifying polygons shown in FIG. 21B can also be used in a similar manner in the situations of FIGS. 17A, 17B,19A to 19C, 20A, and 20B, etc. In such a case, details such as the degree of difficulty of the problems, the degree of difficulty of the mini-games, and the probability of symbols lining up could be varied in accordance with the positions, numbers, and translucency of the polygons that are specified by the player, or the range of variation of the image information. To rephrase that more generally, the details of the game-clear conditions (such as the degree of difficulty or type) could be varied in accordance with the details of changes in image information (such as range, degree, or type).

Conversely, the number or position of polygons to be set to non-display, the number or position of polygons to be made transparent or translucent, a range to be made transparent or translucent, differences in translucency, or a range of textures to be changed could be varied in accordance with the degree of difficulty of the problems, the degree of difficulty of the mini-games, or the type of symbols lining up. To rephrase that more generally, the details of changes in image information (such as range, degree, or type) could be varied in accordance with the details of the game-clear conditions (such as the degree of difficulty or type).

Note that the various image information changing methods described with reference to FIGS. 12A to 12D, 13A, and 13B can also be used in FIGS. 19C, 20B, and 21B, not just in FIG. 17B.

Figure 22:
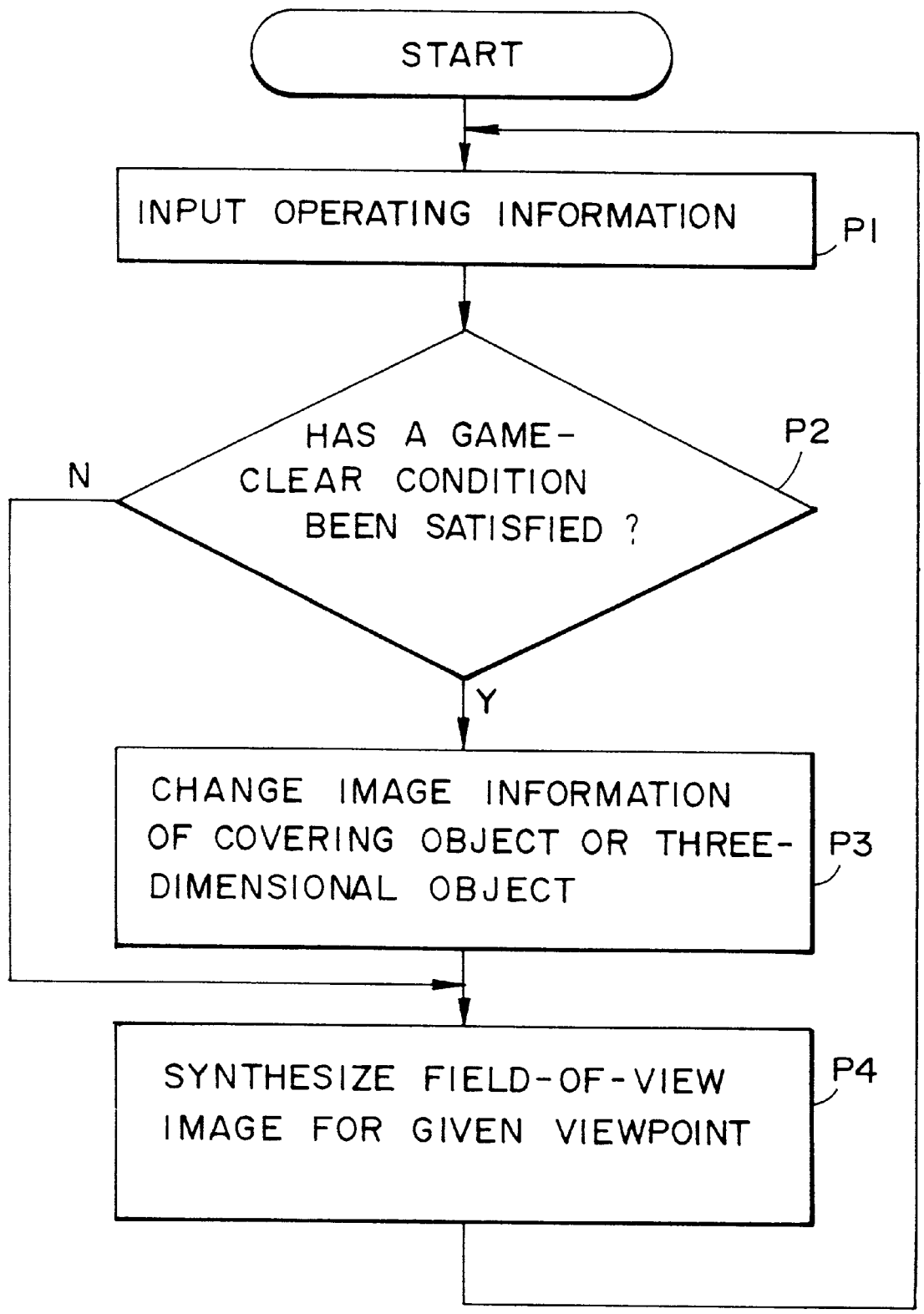
FIG. 22 is a flowchart illustrating the operation of Embodiment 2.

The operation of Embodiment 2 will now be described with reference to the flowchart shown in FIG. 22. First of all, the player inputs operating information through the operation section 12 and a determination is made as to whether or not a game-clear condition has been satisfied (stops P1 and P2). If it has been satisfied such that the ratio of correct answers or the number of points obtained is greater than or equal to a fixed value, predetermined symbols are lined up, or a special combination of the Mah-Jongg tiles is obtained, image information of the covering object or three-dimensional object is changed (step P3). At this point, it is preferable to vary the details of the image information change on the basis of the details of the game-clear condition. A field-of-view image is synthesized for a given viewpoint and line-of-sight direction such that the player can see the change in the image (step P4). In this case, the configuration could be such that the player can select the viewpoint and line-of-sight direction and thus a field-of-view image is displayed from a viewpoint and line-of-sight direction that the player wants.

Figure 23:
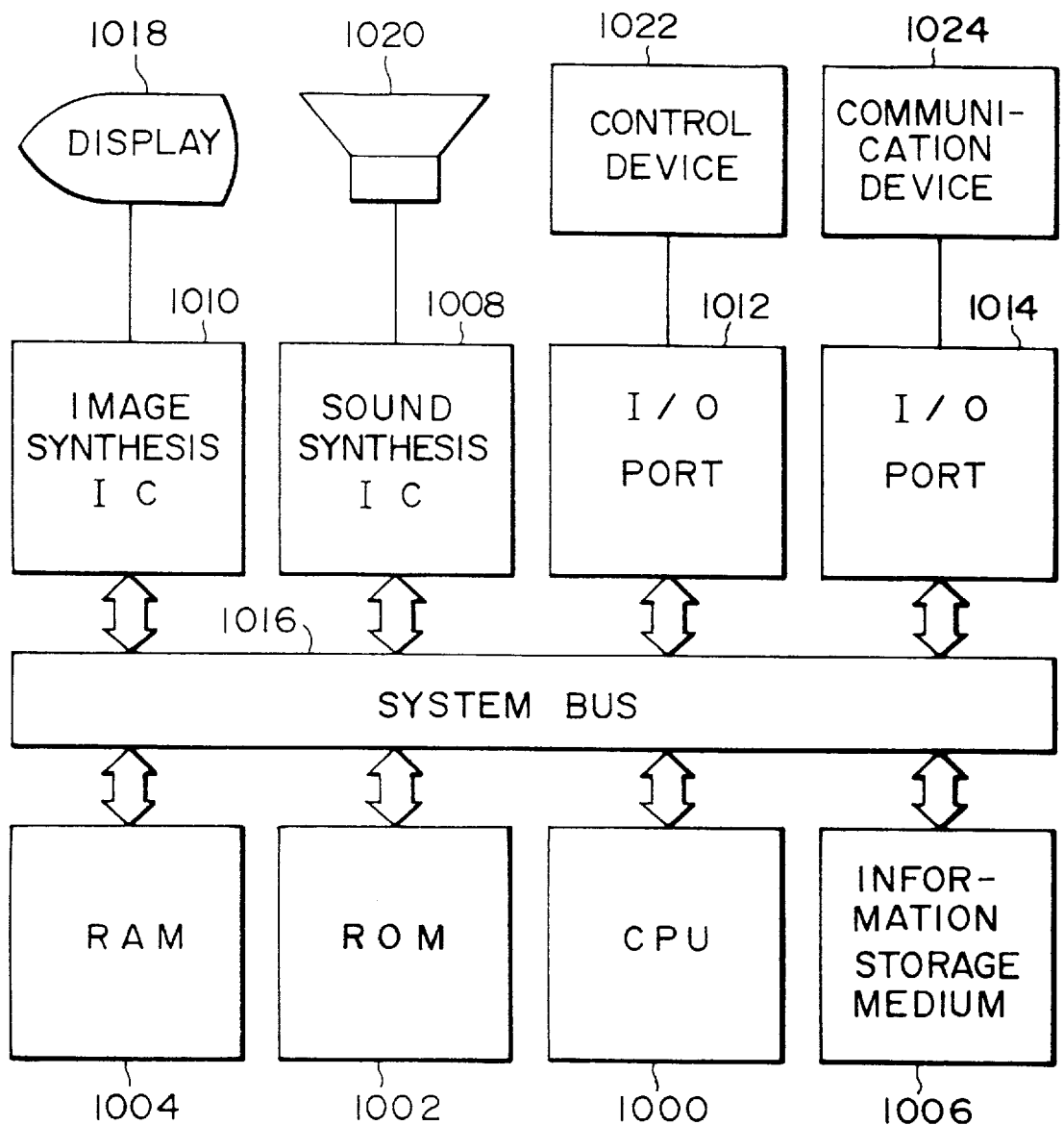
FIG. 23 shows an example of a hardware configuration that implements Embodiments 1 and 2.

A configurational example of the hardware of a game machine that enables the implementation of Embodiments 1 and 2 will now be described, with reference to FIG. 23. In the device in this figure, a CPU 1000, ROM 1002, RAM 1004, information storage medium 1006, sound synthesis IC 1008, image synthesis IC 1010, and I/O ports 1012 and 1014 are connected together by a system bus 1016 so that data can be transferred therebetween. A display 1018 is connected to the image synthesis IC 1010, a speaker 1020 is connected to the sound synthesis IC 1008, a control device 1022 is connected to the I/O port 1012, and a communications device 1024 is connected to the I/O port 1014.

Image information or the like for representing a game program and display objects is mainly stored in the information storage medium 1006, and a CD-ROM, game cassette, IC card, magnet-optical (MO) disk, floppy disk, digital video disk (DVD), or memory is used therefor. Means such as a CD-ROM or game cassette could be used as an information storage medium for storing a game program for a domestic game machine, for example, or memory such as ROM could be used for a commercial game machine.

The control device 1022 is equivalent to a game controller or operating panel and it is used as a device for inputting into the main unit of the device the effects of decisions made by the player as the game progresses.

The CPU 1000 controls the entire device and processes data in accordance with a game program stored in the information storage medium 1006, a system program stored in the ROM 1002 (including initialization information for the entire device, and signals input through the control device 1022. The RAM 1004 is a storage means that is used as a work space for the CPU 1000, and given details from the information storage medium 1006 or the ROM 1002, or the results of computations by the CPU 1000, are stored therein. A data configuration having the logical structure of the vertex relationship list (see FIG. 9A), vertex position list (FIG. 10B), or the polygon information list (FIG. 10C) is built on this RAM or information storage medium.

The provision of the sound synthesis IC 1008 and the image synthesis IC 1010 in this type of device makes it possible to output game sounds and game images as required. The sound synthesis IC 1008 is an integrated circuit device that synthesizes game sounds such as sound effects and background music, based on information stored in the information storage medium 1006 or the ROM 1002, and the thus synthesized game sounds are output by the speaker 1020. The image synthesis IC 1010 is an integrated circuit device that synthesizes pixel information for output to the display 1018, based on image information that is sent from components such as the RAM 1004, the ROM 1002, and the information storage medium 1006. Note that a device called a head-mounted display (HMD) could be used as the display 1018.

The communications device 1024 is designed to transfer various types of information used within the game machine to and from external devices, and it is used to send and receive given information in accordance with a game program to another game machine, or send and receive information such as a game program through a communications circuit.

The image synthesis processing described with reference to FIGS. 1A to 13B, 16A to 21B, 25A, and 25B is implemented by components such as the information storage medium 1006 that contains a game program for performing processing such as that shown in the flowcharts of FIGS. 14, 15, and 22, the CPU 1000 that operates in accordance with the game program, the image synthesis IC 1010. Note that the processing performed by the image synthesis IC 1010 and the sound synthesis IC 1008 could be performed in a software manner by means such as the CPU 1000 or an ordinary digital signal processor (DSP).

Figure 24A:
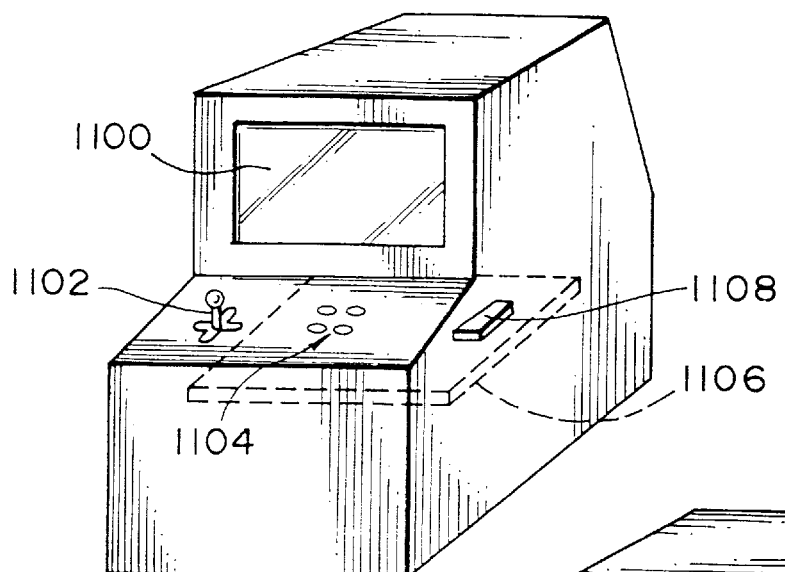
FIGS. 24A to 24C show various kinds of game machines to which Embodiments 1 and 2 can be applied.

An example of this embodiment applied to a commercial game machine is shown in FIG. 24A. A player enjoys the game by operating a joystick 1102 and buttons 1104, while viewing a game image projected onto a display 1100. Components such as a CPU, image synthesis IC, and sound synthesis IC are mounted on a system substrate 1106 built into the device. Information that is stored in a memory 1108, which is an information storage medium mounted on the system substrate 1106, includes information for disposing three-dimensional objects and covering objects within an object space, information for changing image information every time a game-clear condition is satisfied, information for causing a moving body to move over a covering object or three-dimensional object, information for changing image information of a covering object or three-dimensional object in a specified region, and information for synthesizing a field-of-view image for a given viewpoint and line-of-sight direction within an object space (the viewpoint and line-of-sight direction follow the movement of the moving body). This information is hereinafter called stored information. This stored information comprises at least one type of information, such as program coding for performing the above described processing, image information, sound information, shape information for display objects, table data, list data, or player information.

Figure 24B:
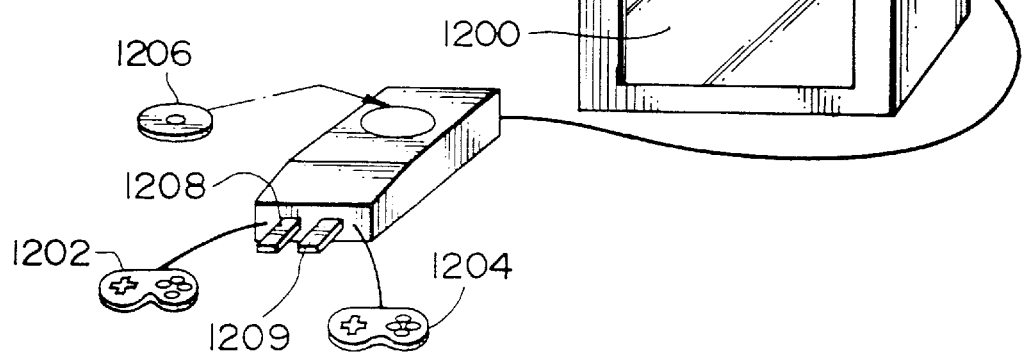

An example of this embodiment applied to a domestic game machine is shown in FIG. 24B. Players enjoy the game by operating game controllers 1202 and 1204 while viewing a game image that is projected onto a display 1200. In this case, the above described stored information is stored in a CD-ROM 1206 or IC cards 1208 and 1209 or the like, which are information storage media that can be freely inserted into and removed from the main unit.

Figure 24C:
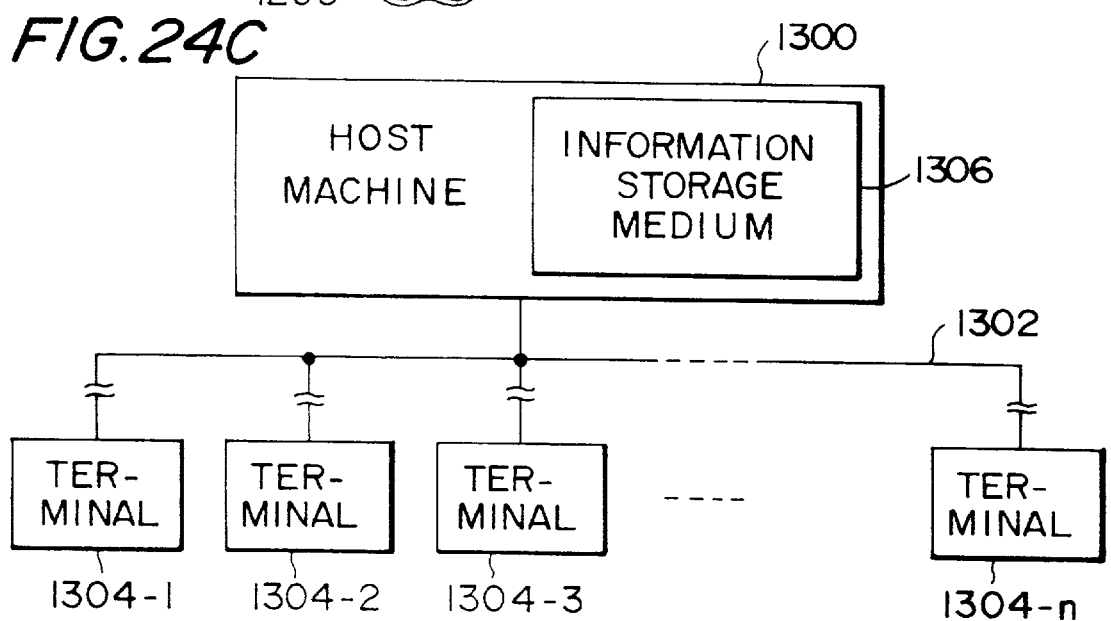

Another example of this embodiment applied to a game machine is shown in FIG. 24C, where the game machine comprises a host machine 1300 and terminals 1304-1 to 1304-*n* connected to the host machine 1300 by a communication line 1302. In this case, the above described stored information is stored in an information storage medium 1306 such as a magnetic disk, magnetic tape, or memory that can be controlled by the host machine 1300. Each of the terminals 1304-1 to 1304-*n* has a CPU, an image synthesis IC, and a sound synthesis IC, and, if game images and sounds can be synthesized thereby in a standalone manner, means such as a game program for synthesizing game images and sounds is transferred to the terminals 1304-1 to 1304-*n* from the host machine 1300. On the other hand, if they cannot be synthesized in a stand-alone manner, the configuration is such that the host machine 1300 creates the game images and sounds then transfers them to the terminals 1304-1 to 1304-*n* for output by those terminals.

Note that this invention is not limited to the above described Embodiments 1 and 2 and thus it can be implemented in many various ways.

For example, although the method of changing the image information that was described with reference to FIGS. 12A to 12D, 13A, and 13B is particularly preferable from the viewpoints of simplicity of processing and improvement of the visual effect, various other methods could be used therefor, provided they make it possible to change the image information at least every time a game-clear condition is satisfied.

In addition, the game-clear conditions are not limited to those of these embodiments. Furthermore, this invention could be applied to various games other than those described in Embodiments 1 and 2, such as puzzle games, Shogi, Go, horseracing games, card games, Othello, picture-matching games, and simulation games in which characters grow.

It is particularly preferable that the viewpoint and line-of-sight direction should follow the movement of the moving body, because of the visual effect, but they could equally well be set to not follow that movement. For example, a field-of-view image from a viewpoint that has absolutely no relationship with the position of the moving body could be synthesized at the start of the game or at the end thereof. The methods of specifying a region by the movement of the moving body that were described with reference to FIGS. 6A to 6F and 7A to 7D are particularly preferable for making the most of the covering object that is formed to be three-dimensional, but various other methods could be used therefor. For example, the region could be specified by a portion of an edge of the covering object and the movement track of the moving body.

This invention is not limited to domestic and arcade game machines; it can also be applied to various other game machines such as simulators, large-scale attractions in which many players can participate, personal computers, multimedia terminals, system boards that generate game images.

Similarly, the processes performed by the processing and image synthesis sections of these embodiments were simply given as examples of these embodiments and it should be noted that the image synthesis processing of this invention is not limited thereto.

What is claimed is:

1. A three-dimensional game machine comprising:

means for setting the dispositions within an object space of at least one three-dimensional object and a covering object that is provided in such a manner as to cover said at least one three-dimensional object;

image information changing means for sequentially switching the display/non-display state of at least one polygon or at least one curved surface configuring said covering object every time one game-clear condition among a plurality of given game-clear conditions is satisfied; and means for synthesizing a field-of-view image as seen from a given viewpoint within said object space.

2. A three-dimensional game machine comprising:

means for setting the dispositions within an object space of at least one three-dimensional object and a covering object that is provided in such a manner as to cover said at least one three-dimensional object;

image information changing means for sequentially switching the transparent/non-transparent state of at least a part of said covering object, or for sequentially changing the transparency of at least a part of said covering object, every time one game-clear condition among a plurality of given game-clear conditions is satisfied; and means for synthesizing a field-of-view imago as seen from a given viewpoint within said object space.

3. A three dimensional game machine comprising:

means for setting the disposition of at least one three-dimensional object within an object space;

image information changing means for sequentially changing a texture that is mapped over at least a part of said three-dimensional object, every time one game-clear condition among a plurality of given game-clear conditions is satisfied; and means for synthesizing a field-of-view image as seen from a given viewpoint within said object space.

4. The three-dimensional game machine as defined in claim 1, wherein said game-clear condition is at least one of:

clearing at least one game stage of a plurality of game stages, clearing at least one mini-game of a plurality of mini-games, and specifying at least one region among a plurality of regions.

5. The three-dimensional game machine as defined in claim 2, wherein said game-clear condition is at least one of:

clearing at least one game stage of a plurality of game stages, clearing at least one mini-game of a plurality of mini-games, and specifying at least one region among a plurality of regions.

6. The three-dimensional game machine as defined in claim 3, wherein said game-clear condition is at least one of:

clearing at least one game stage of a plurality of game stages, clearing at least one mini-game of a plurality of mini-games, and specifying at least one region among a plurality of regions.

7. A three-dimensional game machine comprising:

moving body computation means for performing computations to cause a moving body to move over a covering object that is provided in such a manner as to cover at least one three-dimensional object that is disposed within an object space, on the basis of operating information from an operating means;

image information changing means for changing image information of said covering object within a specified region, when said region is specified by a movement of said moving body, said region being among a plurality of regions into which said covering object has been previously divided; and means for synthesizing a field-of-view image for a viewpoint and line-of-sight direction that follow the movement of said moving body around said covering object.

8. A three-dimensional game machine comprising:

moving body computation means for performing computations to cause a moving body to move over a covering object that is provided in such a manner as to cover at least one three-dimensional object that is disposed within an object space, on the basis of operating information from an operating means;

image information changing means for changing image information of said covering object within a specified region, when a movement track of said moving body intersects itself and said region is specified as a closed region bounded by an edge defined by said intersecting movement track; and means for synthesizing a field-of-view image for a given viewpoint and line-of-sight direction within said object space.

9. The three-dimensional game machine as defined in claim 7, wherein said image information changing means switches the display/non-display state of at least one polygon or at least one curved surface in said specified region, when said covering object is formed of a plurality of polygons or a plurality of curved surfaces.

10. The three-dimensional game machine as defined in claim 8, wherein said image information changing means switches the display/non-display state of at least one polygon or at least one curved surface in said specified region, when said covering object is formed of a plurality of polygons or a plurality of curved surfaces.

11. The three-dimensional game machine as defined in claim 7, wherein said image information changing means switches the transparent/non-transparent state of at least a part of said covering object within said specified region, or changes the transparency of at least a part of said covering object.

12. The three-dimensional game machine as defined in claim 8, wherein said image information changing means switches the transparent/non-transparent state of at least a part of said covering object within said specified region, or changes the transparency of at least a part of said covering object.

13. A three-dimensional game machine comprising:

moving body computation means for performing computations to cause a moving body to move over at least one three-dimensional object disposed within an object space, on the basis of operating information from an operating means;

image information changing means for changing image information of said three-dimensional object within a specified region, when said region is specified by a movement of said moving body, said region being among a plurality of regions into which said three-dimensional object has been previously divided; and means for synthesizing a field-of-view image from a viewpoint and line-of-sight direction that follow the movement of said moving body around said three-dimensional object.

14. A three-dimensional game machine comprising:

moving body computation means for performing computations to cause a moving body to move over at least one three-dimensional object disposed within an object space, on the basis of operating information from an operating means;

image information changing means for changing image information of said three-dimensional object within a specified region, when a movement track of said moving body intersects itself and said region is specified as a closed region bounded by an edge defined by said intersecting movement track; and means for synthesizing a field-of-view image for a given viewpoint and line-of-sight direction within said object space.

15. The three-dimensional game machine as defined in claim 13, wherein said image information changing means changes a texture that is mapped over at least part of said specified region.

16. The three-dimensional game machine as defined in claim 14,
wherein said image information changing means changes a texture that is mapped over at least part of said specified region.

17. The three-dimensional game machine as defined in claim 7,
wherein said moving body computation means performs computations to cause said moving body to move on the edge of a polygon, when said covering object is formed of polygons, on the basis of vertex position information of said polygon.

18. The three-dimensional game machine as defined in claim 8,
wherein said moving body computation means performs computations to cause said moving body to move on the edge of a polygon, when said covering object is formed of polygons, on the basis of vertex position information of said polygon.

19. The three-dimensional game machine as defined in claim 13,
wherein said moving body computation means performs computations to cause said moving body to move on the edge of a polygon, when said three-dimensional object is formed of polygons, on the basis of vertex position information of said polygon.

20. The three-dimensional game machine as defined in claim 14,
wherein said moving body computation means performs computations to cause said moving body to move on the edge of a polygon, when said three-dimensional object is formed of polygons, on the basis of vertex position information of said polygon.

21. An information storage medium for storing at least information for synthesizing a field-of-view image, said information storage medium storing:
information for setting the dispositions within an object space of at least one three-dimensional object and a covering object that is provided in such a manner as to cover said at least one three-dimensional object;
information for sequentially switching the display/non-display state of at least one polygon or at least one curved surface configuring said covering object every time one game-clear condition among a plurality of given game-clear conditions is satisfied; and
information for synthesizing a field-of-view image as seen from a given viewpoint within said object space.

22. An information storage medium for storing at least information for synthesizing a field-of-view image, said information storage medium storing:
information setting the dispositions within an object space of at least one three-dimensional object and a covering object that is provided in such a manner as to cover said at least one three-dimensional object;
information for sequentially switching the transparent/non-transparent state of at least a part of said covering object, or sequentially changing the transparency of at least a part of said covering object, every time one game-clear condition among a plurality of given game-clear conditions is satisfied; and
information for synthesizing a field-of-view image as seen from a given viewpoint within said object space.

23. An information storage medium for storing at least information for synthesizing a field-of-view image, said information storage medium storing:
information for setting the disposition of at least one three-dimensional object within an object space;
information for sequentially changing a texture that is mapped over at least a part of said three-dimensional object, every time one game-clear condition among a plurality of given game-clear conditions is satisfied; and
information for synthesizing a field-of-view image as seen from a given viewpoint within said object space.

24. An information storage medium for storing at least information for synthesizing a field-of-view image, said information storage medium storing:
information for performing computations to cause a moving body to move over a covering object that is provided in such a manner as to cover at least one three-dimensional object that is disposed in an object space, on the basis of operating information from an operating means;
information for changing image information of said covering object within a specified region, when said region is specified by a movement of said moving body, said region being among a plurality of regions into which said covering object has been previously divided; and
information for synthesizing a field-of-view image for a viewpoint and line-of-sight direction that follow the movement of said moving body around said covering object.

25. An information storage medium for storing at least information for synthesizing a field-of-view image, said information storage medium storing:
information for performing computations to cause a moving body to move over a covering object that is provided in such a manner as to cover at least one three-dimensional object that is disposed in an object space, on the basis of operating information from an operating means;
information for changing image information of said covering object within a specified region, when a movement track of said moving body intersects itself and said region is specified as a closed region bounded by an edge defined by said intersecting movement track; and
information for synthesizing a field-of-view image for a given viewpoint and line-of-sight direction within said object space.

26. An information storage medium for storing at least information for synthesizing a field-of-view image, said information storage medium storing:
information for performing computations to cause a moving body to move over at least one three-dimensional object disposed within an object space, on the basis of operating information from an operating means;
information for changing image information of said three-dimensional object within a specified region, when said region is specified by a movement of said moving body, said region being among a plurality of regions into which said three-dimensional object has been previously divided; and
information for synthesizing a field-of-view image from a viewpoint and line-of-sight direction that follow the movement of said moving body around said three-dimensional object.

27. An information storage medium for storing at least information for synthesizing a field-of-view image, said information storage medium storing:

information for performing computations to cause a moving body to move over at least one three-dimensional object disposed within an object space, on the basis of operating information from an operating means;

information for changing image information of said three-dimensional object within a specified region, when a movement track of said moving body intersects itself and said region is specified as a closed region bounded by an edge defined by said intersecting movement track; and information for synthesizing a field-of-view image for a given viewpoint and line-of-sight direction within said object space.

* * * * *